United States Patent
Son et al.

(10) Patent No.: US 12,160,335 B2
(45) Date of Patent: *Dec. 3, 2024

(54) WIRELESS COMMUNICATION METHOD AND WIRELESS COMMUNICATION TERMINAL

(71) Applicants: WILUS INSTITUTE OF STANDARDS AND TECHNOLOGY INC., Gyeonggi-do (KR); SK TELECOM CO., LTD., Seoul (KR)

(72) Inventors: Juhyung Son, Gyeonggi-do (KR); Jinsam Kwak, Gyeonggi-do (KR); Geonjung Ko, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,516

(22) Filed: Jul. 5, 2023

(65) Prior Publication Data

US 2023/0353434 A1 Nov. 2, 2023

Related U.S. Application Data

(63) Continuation of application No. 17/232,147, filed on Apr. 16, 2021, now Pat. No. 11,736,328, which is a
(Continued)

(30) Foreign Application Priority Data

Oct. 14, 2014 (KR) .................. 10-2014-0138645
Oct. 27, 2014 (KR) .................. 10-2014-0146062
Nov. 18, 2014 (KR) .................. 10-2014-0161167

(51) Int. Cl.
*H04L 27/26* (2006.01)
*H04L 1/00* (2006.01)
(Continued)

(52) U.S. Cl.
CPC ........ *H04L 27/2613* (2013.01); *H04L 1/0031* (2013.01); *H04L 1/0063* (2013.01);
(Continued)

(58) Field of Classification Search
None
See application file for complete search history.

(56) References Cited

U.S. PATENT DOCUMENTS

2013/0201835 A1   8/2013   Banerjea et al.
2013/0258994 A1   10/2013  Kim et al.
(Continued)

FOREIGN PATENT DOCUMENTS

KR   10-2013-0040152   4/2013
KR   10-1843151        3/2018
(Continued)

OTHER PUBLICATIONS

International Preliminary Report on Patentability (Chapter I) for PCT/KR2015/010853 issued on Apr. 18, 2017 and its English translation from WIPO (published as WO 2016/060479).
(Continued)

*Primary Examiner* — Chi H Pham
*Assistant Examiner* — Raul Rivas
(74) *Attorney, Agent, or Firm* — WOMBLE BOND DICKINSON (US) LLP

(57) ABSTRACT

A wireless communication terminal is disclosed. The wireless communication terminal includes a transceiver transmitting/receiving a wireless signal, and a processor controlling an operation of the wireless communication terminal. The transceiver obtains a signaling field from a physical
(Continued)

frame including data to be transmitted from a base wireless communication terminal to each of a plurality of wireless communication terminals including the wireless communication terminal, and receives, from the physical frame based on the signaling field, the data having been transmitted from the base wireless communication terminal to the wireless communication terminal. The signaling field signals information about the plurality of wireless communication terminals. The base wireless communication terminal is any one wireless communication terminal different from the plurality of wireless communication terminals.

12 Claims, 27 Drawing Sheets

Related U.S. Application Data continuation of application No. 16/584,789, filed on Sep. 26, 2019, now Pat. No. 11,012,276, which is a continuation of application No. 15/519,294, filed as application No. PCT/KR2015/010853 on Oct. 14, 2015, now Pat. No. 10,484,222.

(51) Int. Cl.
| | | |
|---|---|---|
| *H04L 5/00* | (2006.01) | |
| *H04W 72/0453* | (2023.01) | |
| *H04W 72/23* | (2023.01) | |
| *H04W 84/12* | (2009.01) | |

(52) U.S. Cl.
CPC .......... *H04L 1/0079* (2013.01); *H04L 5/0023* (2013.01); *H04L 5/0092* (2013.01); *H04W 72/0453* (2013.01); *H04W 72/23* (2023.01); *H04L 27/26132* (2021.01); *H04W 84/12* (2013.01)

(56) References Cited

U.S. PATENT DOCUMENTS

| | | |
|---|---|---|
| 2014/0016607 A1 | 1/2014 | Hart |
| 2014/0286238 A1 | 9/2014 | Erceg et al. |
| 2017/0264475 A1 | 9/2017 | Son et al. |
| 2020/0028724 A1 | 1/2020 | Son et al. |
| 2021/0234741 A1 | 7/2021 | Son et al. |

FOREIGN PATENT DOCUMENTS

| | | |
|---|---|---|
| WO | 2013/165582 | 11/2013 |
| WO | 2016/060479 | 4/2016 |

OTHER PUBLICATIONS

International Search Report for PCT/KR2015/010853 mailed on Feb. 12, 2016 and its English translation from WIPO (now published as WO 2016/060479).
Written Opinion of the International Searching Authority for PCT/KR2015/010853 mailed on Feb. 12, 2016 and its English translation from WIPO (now published as WO 2016/060479).
Notice of Allowance dated Jun. 26, 2019 for U.S. Appl. No. 15/519,294 (now published as 2017/0264475).
Advisory Action dated Apr. 4, 2019 for U.S. Appl. No. 15/519,294 (now published as 2017/0264475).
Final Office Action dated Jan. 4, 2019 for U.S. Appl. No. 15/519,294 (now published as 2017/0264475).
Non-Office Action dated Jun. 12, 2018 for U.S. Appl. No. 15/519,294 (now published as 2017/0264475).
Notice of Allowance dated Jan. 19, 2021 for U.S. Appl. No. 16/584,789 (now published as 2020/0028724).
Office Action dated Oct. 13, 2020 for U.S. Appl. No. 16/584,789 (now published as 2020/0028724).
Office Action dated Apr. 21, 2022 for Korean Patent Application No. 10-2022-7005289 and its English translation provided by Applicant's foreign counsel.
Notice of Allowance dated May 12, 2022 for Korean Patent Application No. 10-2020-7018865 and its English translation provided by Applicant's foreign counsel.
Office Action dated Nov. 25, 2021 for Korean Patent Application No. 10-2020-7018865 and its English translation provided by Applicant's foreign counsel.
Notice of Allowance dated Nov. 24, 2021 for Korean Patent Application No. 10-2020-7018866 and its English translation provided by Applicant's foreign counsel.
Office Action dated May 28, 2021 for Korean Patent Application No. 10-2020-7018865 and its English translation provided by Applicant's foreign counsel.
Office Action dated May 28, 2021 for Korean Patent Application No. 10-2020-7018866 and its English translation provided by Applicant's foreign counsel.
Notice of Allowance dated Apr. 5, 2023 for U.S. Appl. No. 17/232,147 (now published as 2021/0234741).
Office Action dated Dec. 19, 2022 for U.S. Appl. No. 17/232,147 (now published as 2021/0234741).

WIRELESS COMMUNICATION METHOD AND WIRELESS COMMUNICATION TERMINAL

CROSS-REFERENCE TO RELATED APPLICATIONS

This application is a continuation of U.S. patent application Ser. No. 17/232,147 filed on Apr. 16, 2021, which is a continuation of U.S. patent application Ser. No. 16/584,789 filed on Sep. 26, 2019, now issued as U.S. Pat. No. 11,012,276 on May 18, 2021, which is a continuation of U.S. patent application Ser. No. 15/519,294 filed on Apr. 14, 2017, now issued as U.S. Pat. No. 10,484,222 dated Nov. 19, 2019, which is the U.S. National Stage of International Patent Application No. PCT/KR2015/010853 filed on Oct. 14, 2015, which claims the priority to Korean Patent Application No. 10-2014-0138645 filed in the Korean Intellectual Property Office on Oct. 14, 2014, Korean Patent Application No. 10-2014-0146062 filed in the Korean Intellectual Property Office on Oct. 24, 2014 and Korean Patent Application No. 10-2014-0161167 filed in the Korean Intellectual Property Office on Nov. 18, 2014, the entire contents of which are incorporated herein by reference.

TECHNICAL FIELD

The present invention relates to a wireless communication method and a wireless communication terminal for setting a broadband link. More specifically, the present invention relates to a wireless communication method and a wireless communication terminal for increasing data communication efficiency by expanding a data transmission bandwidth of a terminal.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a radio interface accepted by 802.11n, such as a wider radio frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

Especially, as the number of devices using a wireless LAN increases, it is necessary to efficiently use a predetermined channel. Therefore, required is a technology capable of efficiently using bandwidths by simultaneously transmitting data between a plurality of stations and APs.

DISCLOSURE

Technical Problem

An object of the present invention is to provide an efficient wireless communication method and wireless communication terminal.

Another object of the present invention is to provide a wireless communication method in which one wireless communication terminal transmits data to a plurality of wireless communication terminals simultaneously and a wireless communication terminal.

Technical Solution

A wireless communication terminal according to an embodiment of the present invention includes: a transceiver transmitting/receiving a wireless signal; and a processor controlling an operation of the wireless communication terminal, wherein the transceiver obtains a signaling field from a physical frame including data to be transmitted from a base wireless communication terminal to each of a plurality of wireless communication terminals including the wireless communication terminal, and receives, from the physical frame based on the signaling field, the data having been transmitted from the base wireless communication terminal to the wireless communication terminal, the signaling field signals information about the plurality of wireless communication terminals, and the base wireless communication terminal is any one wireless communication terminal different from the plurality of wireless communication terminals.

The plurality of wireless communication terminals may be divided into a plurality of groups, and the signaling field may include an independent sub-field for each of the plurality of the groups.

At this point, the signaling field may further include a field indicating a number of the plurality of groups.

In addition, the signaling field may include a plurality of fields indicating identifiers respectively identifying the plurality of groups.

The signaling field may include information about sub-frequency bands respectively allocated to the plurality of wireless communication terminals.

At this point, bandwidths of sub-frequency bands respectively allocated to the plurality of wireless communication terminals may be uniform In addition, the signaling field may include a field indicating whether to use Orthogonal Frequency-Division Multiple Access (OFDMA) transmission.

In addition, the signaling field may include a field indicating whether the sub-frequency bands respectively allocated to the plurality of wireless communication terminals are contiguous frequency bands.

In addition, the information about the sub-frequency band may include any one of information about a sub-frequency bandwidth, information indicating a space-time stream number, information indicating whether convolution coding is applied to the data for each of the plurality of wireless communication terminals, and information indicating whether an additional OFDM symbol is required by applying Low-density parity-check code (LDPC) coding to the data for each of the plurality of wireless communication terminals.

A frequency band allocated to the plurality of wireless communication terminals may include a primary channel of a frequency band usable by the base wireless communication terminal.

The base wireless communication terminal may use a frequency band having a bandwidth equal to or greater than a minimum unit frequency bandwidth, and the signaling field may indicate that the minimum unit frequency bandwidth, in which different pieces of information are transmitted in a unit of the minimum unit frequency bandwidth, indicates a minimum bandwidth of a frequency band usable by the base terminal.

A base wireless communication terminal according to an embodiment of the present invention includes: a transceiver transmitting/receiving a wireless signal; and a processor controlling an operation of the wireless communication terminal, wherein the transceiver transmits, to a plurality of wireless communication terminals, a physical frame including data to be transmitted to each of the plurality of wireless communication terminals and a signaling field for signaling information about the plurality of wireless communication terminals, and the base wireless communication terminal is any one wireless communication terminal different from the plurality of wireless communication terminals.

At this point, the plurality of wireless communication terminals may be divided into a plurality of groups, and the signaling field includes an independent sub-field for each of the plurality of the groups.

In addition, the signaling field may further include a field indicating a number of the plurality of groups.

In addition, the signaling field may include a plurality of fields indicating identifiers respectively identifying the plurality of groups.

The signaling field may include information about sub-frequency bands respectively allocated to the plurality of wireless communication terminals.

At this point, bandwidths of sub-frequency bands respectively allocated to the plurality of wireless communication terminals may be uniform In addition, the signaling field may include a field indicating whether to user Orthogonal Frequency-Division Multiple Access (OFDMA) transmission.

In addition, the signaling field may include a field indicating whether the sub-frequency bands respectively allocated to the plurality of wireless communication terminals are contiguous frequency bands.

An operation method of a wireless communication terminal according to an embodiment of the present invention includes: acquiring a signaling field from a physical frame including data to be transmitted from a base wireless communication terminal to each of a plurality of wireless communication terminals including the wireless communication terminal; and receiving, from the physical frame based on the signaling field, the data having been transmitted from the base wireless communication terminal to the wireless communication terminal, wherein the signaling field signals information about the plurality of wireless communication terminals, and the base wireless communication terminal is any one wireless communication terminal different from the plurality of wireless communication terminals.

Advantageous Effects

One embodiment of the present invention provides an efficient wireless communication method and wireless communication terminal.

Especially, one embodiment of the present invention provides a wireless communication method in which one wireless communication terminal transmits data to a plurality of wireless communication terminals simultaneously and a wireless communication terminal.

DESCRIPTION OF DRAWINGS

FIG. 14 illustrates that any one wireless communication terminal according to an embodiment of the present invention allocates a frequency band to 3 wireless communication terminals.

FIG. 15 illustrates that any one wireless communication terminal according to an embodiment of the present invention allocates a frequency band to 2 wireless communication terminals.

FIG. 24 illustrates a configuration of a physical frame including an SIG-A field according to an embodiment of the present invention.

FIG. 25 illustrates a configuration of a physical frame including an SIG-A field according to another embodiment of the present invention.

FIG. 26 illustrates a configuration of a physical frame including an SIG-A field according to another embodiment of the present invention.

MODE FOR CARRYING OUT THE INVENTION

Figure 1:
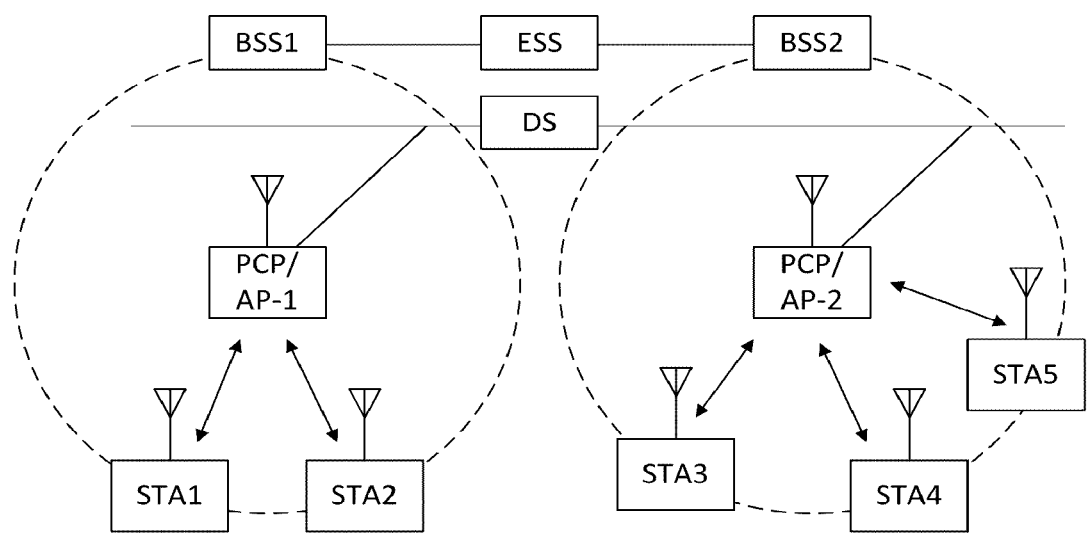
FIG. 1 is a view illustrating a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2014-0138645, Nos. 10-2014-0146062, and Nos 10-2014-0161167 filed in the Korean Intellectual Property Office and the embodiments and mentioned items described in the respective applications are included in the Detailed Description of the present application.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a radio medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
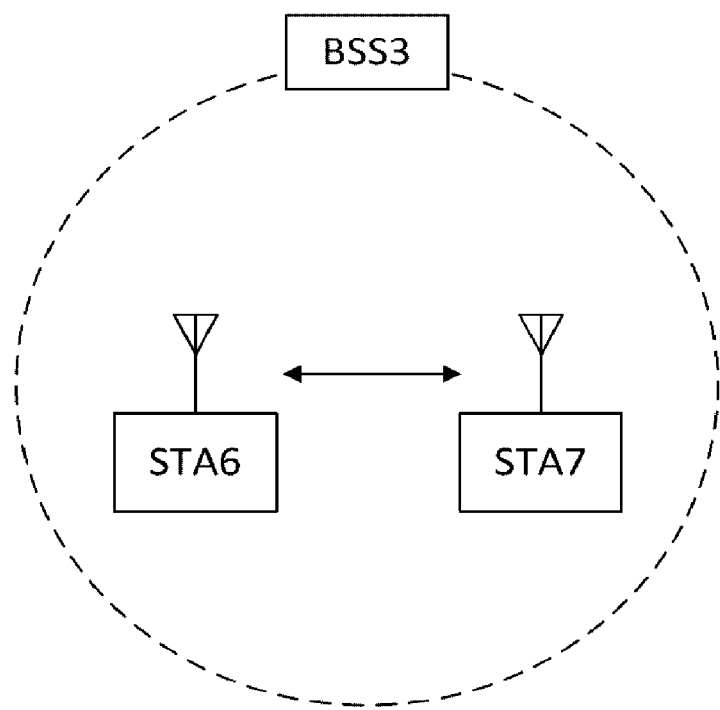
FIG. 2 is a view illustrating a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
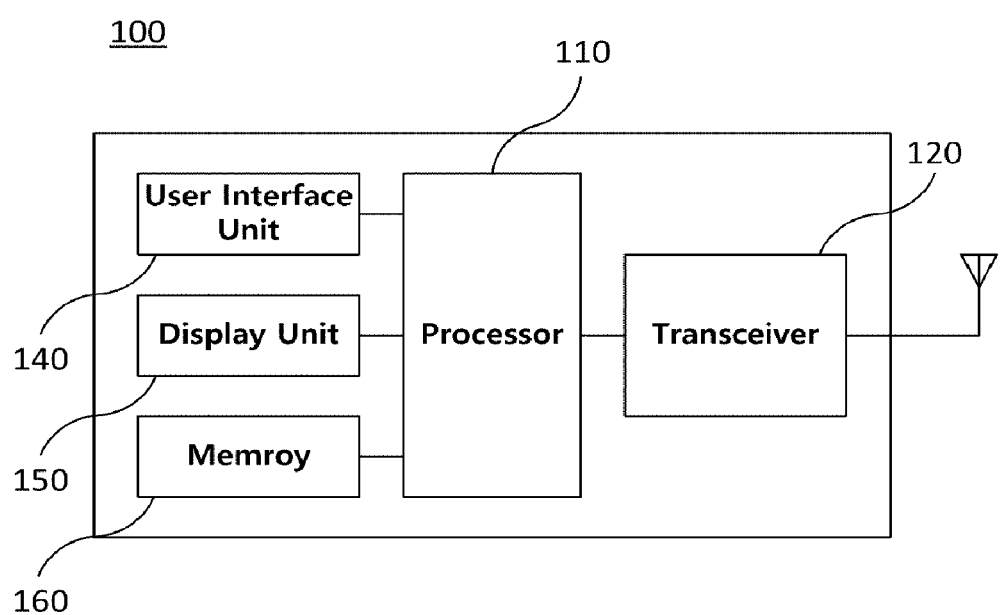
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a radio signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of radio signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
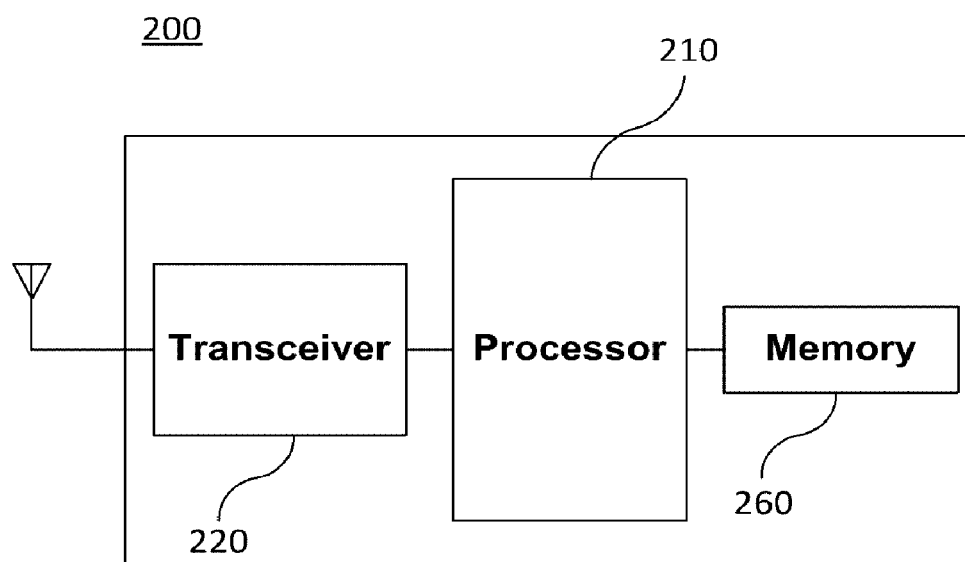
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as radio signal transmission/reception of the AP 200 according to the embodiment of the present invention. A detailed embodiment thereof will be described below.

Figure 5:
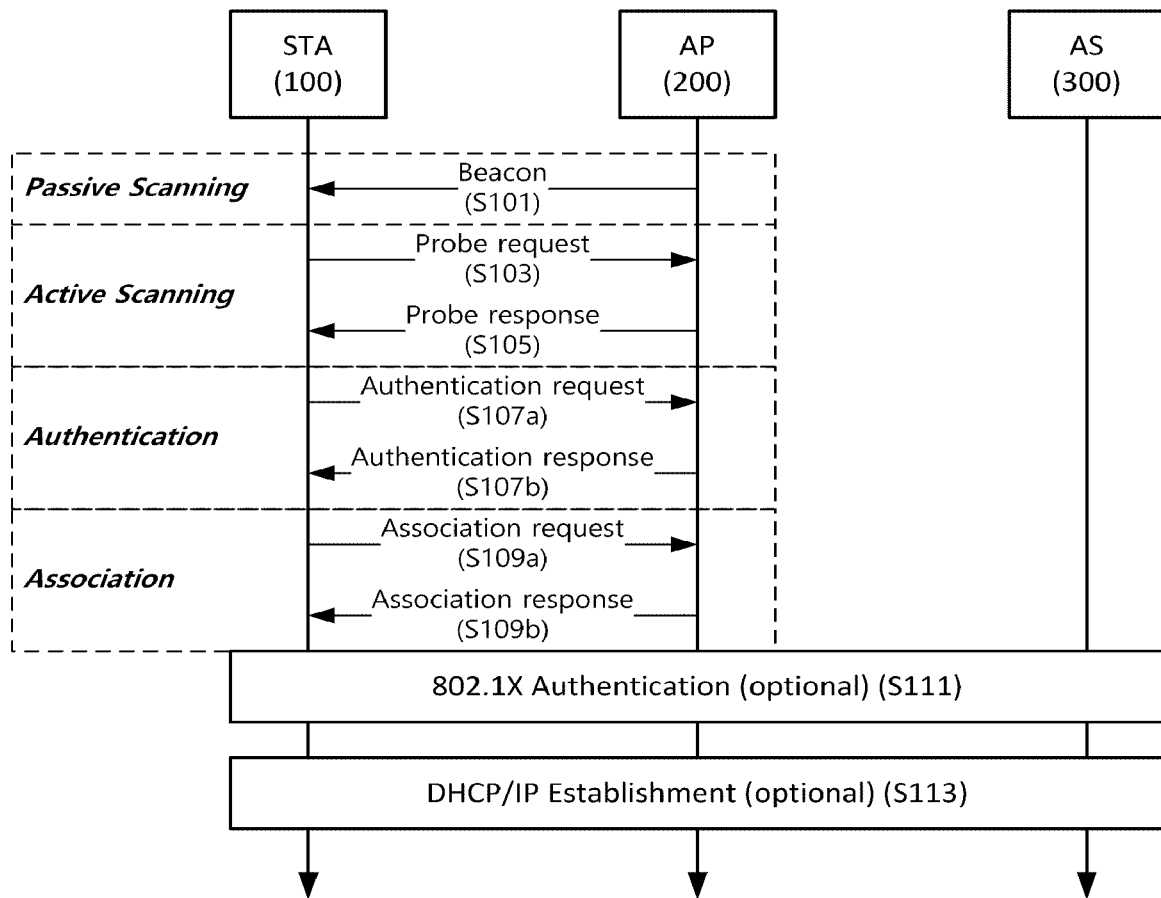
FIG. 5 is a view illustrating a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

When data is transmitted using an orthogonal frequency division multiple access or multi-input multi-output (MIMO) manner, any one wireless communication terminal may simultaneously transmit data to a plurality of wireless communication terminals. In addition, the any one wireless communication terminal may simultaneously receive data from the plurality of wireless communication terminals. In relation to the drawings after FIG. 6, descriptions will be provided about embodiments of the present invention in which any one wireless communication terminal transmits data to a plurality of wireless communication terminals. In particular, in relation to the drawings after FIG. 6, descriptions will be provided about that any one wireless communication terminal respectively allocates frequency bands to a plurality of wireless communication terminals and signals information on the allocated frequency bands.

At this point, the any one wireless communication terminal may respectively allocate sub-channels to the plurality of wireless communication terminals. The sub-channel is a sub-frequency band included in a channel having a minimum unit frequency bandwidth or greater that may be used by the any one wireless communication terminal. In addition, the minimum unit frequency bandwidth indicates the size of the smallest frequency band that may be used by a first wireless communication terminal. In a detailed embodiment, the minimum unit frequency bandwidth may be 20 MHz.

For convenience of explanation, the any one wireless communication terminal simultaneously communicating with the plurality of wireless communication terminals is referred to as the first wireless communication terminal and the plurality of wireless communication terminals simultaneously communicating with the first wireless communication terminal are referred to as a plurality of second wireless communication terminals. In addition, the first wireless communication terminal may be referred to as a base wireless communication terminal. Furthermore, the first wireless communication terminal may be a wireless communication terminal allocating and scheduling communication medium resources in a communication with the plurality of wireless communication terminals. In detail, the first wireless communication terminal may play a role of a cell coordinator. At this point, the first wireless communication terminal may be an access point 200. In addition, the second wireless communication terminal may be a station 100 associated with the access point 200. In a detailed embodiment, the first wireless communication terminal may be a wireless communication terminal allocating and scheduling communication medium resources in an independent network that is not connected to an external distribution service such as an ad-hoc network. Furthermore, the first wireless communication terminal may be at least any one of a base station, an eNB, and a transmission point (TP).

Figure 6:
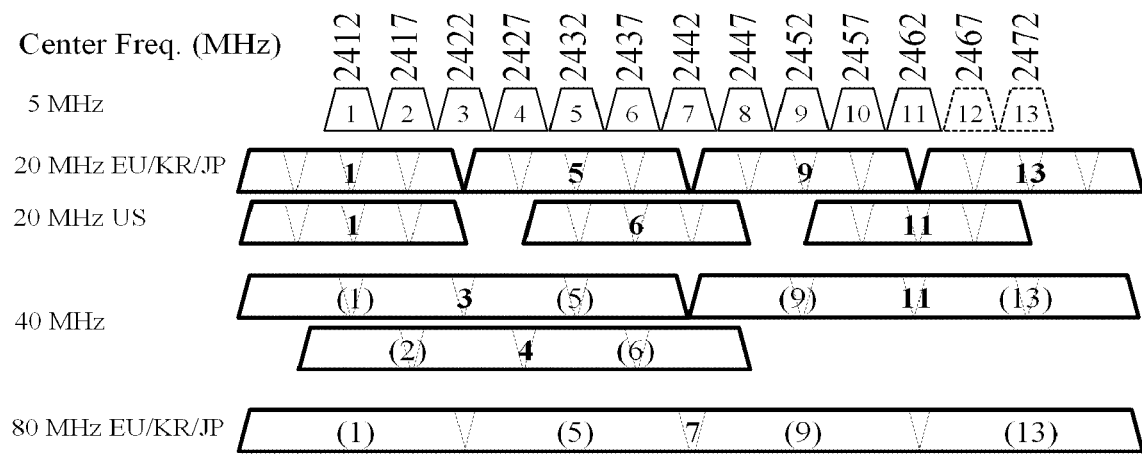
FIG. 6 illustrates channels allocated to wireless communication terminals in a 2.4 GHz band according to an embodiment of the present invention.
Figure 7:
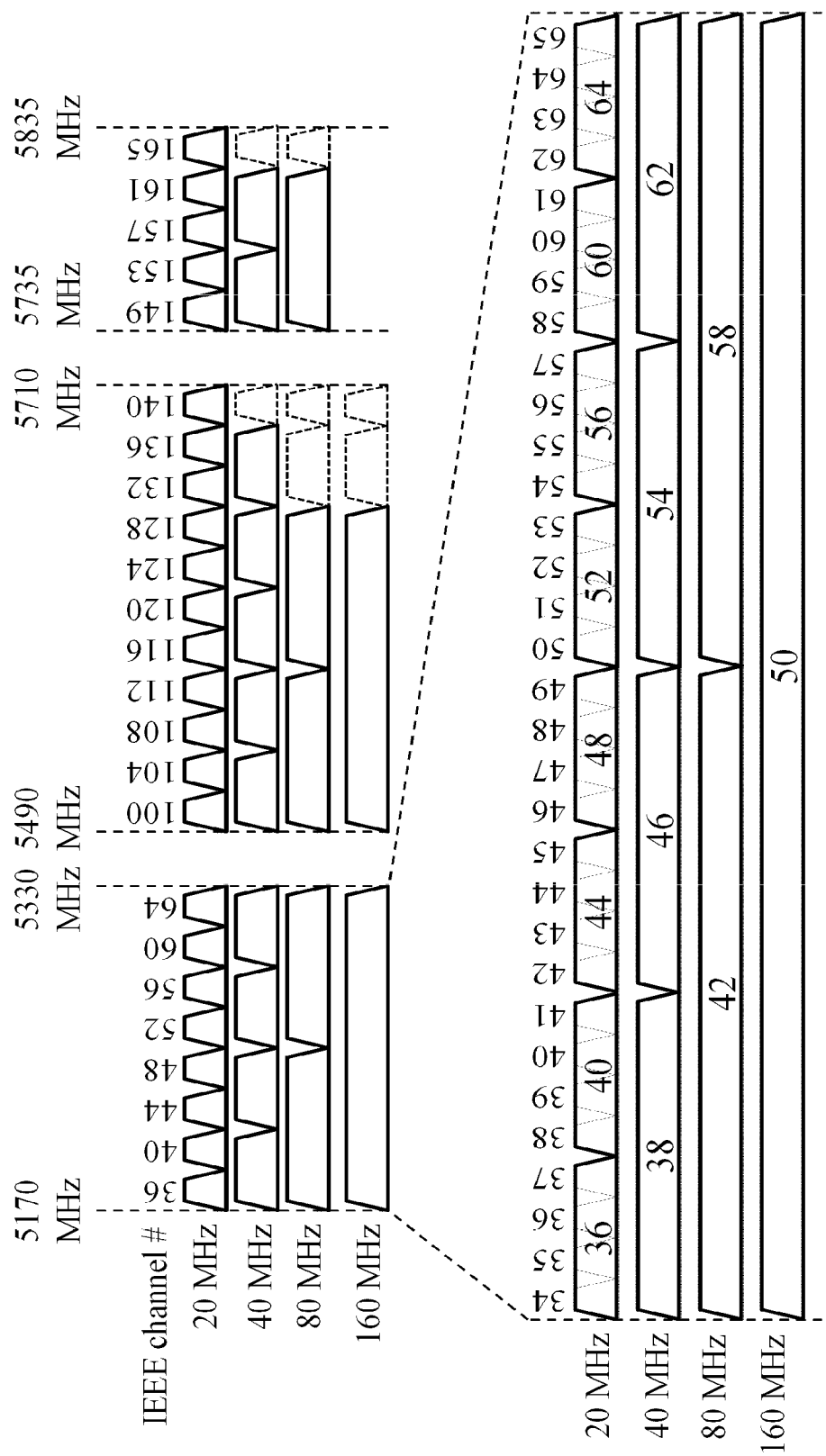
FIG. 7 illustrates channels allocated to wireless communication terminals in a 5 GHz band according to an embodiment of the present invention.

Descriptions will be provided about a frequency band defined as being used by a wireless communication terminal performing a wireless LAN communication and about that a wireless communication terminal according to an embodiment of the present invention uses the defined frequency band in relation to FIGS. 6 and 7.

FIG. 6 illustrates channels allocated to wireless communication terminals in a 2.4 GHz band according to an embodiment of the present invention.

An unlicensed frequency band is a frequency band designated to be used universally without a determined purpose. In detail, a 100 MHz frequency band from 2.4 GHz to 2.5

GHz is an unlicensed industrial scientific medical (ISM) frequency band designated for an industry, science and medical use.

A wireless communication terminal performing wireless LAN communication in the 100 MHz frequency band from 2.4 GHz to 2.5 GHz may use channels from number 1 to number 13 of a 5 MHz unit. At this point, the channel number is granted by Institute of Electrical and Electronics Engineers (IEEE). In detail, a center frequency of channel number 1 is 2412 MHz, a center frequency of channel number 2 is 2417 MHz, and a center frequency of channel number 13 is 2472 MHz. The US uses channels from number 1 to number 11, and most countries except the US use channels from number 1 to number 13.

When using a 20 MHz bandwidth, in order to minimize interference and use frequency bands without superposition, the wireless communication terminal is required to use channels of number 1, 5, 9, and 13. However, since being not able to use channels of number 12 and 13, the US uses three 20 MHz frequency band channels of number 1, 6 and 11 in which the inter-channel interference may be minimized.

When the wireless communication terminal uses a 40 MHz bandwidth, the existing 802.11n standard defines that the wireless communication terminal uses a 40 MHz frequency band with a channel of number 3 or 4 centered.

A wireless communication terminal according to an embodiment of the present invention may use a 40 MHz frequency band with a channel of number 11 centered as well as channels of number 3 and 4. In addition, the wireless communication terminal according to an embodiment of the present invention may use an 80 MHz frequency band with a channel of number 7 centered.

When communicating with the plurality of second wireless communication terminals through Orthogonal Frequency-Division Multiple Access (OFDMA) manner in the 2.4 GHz band, the first wireless communication terminal may use a frequency band having any one bandwidth of 20 MHz, 40 MHz, and 80 MHz.

At this point, each of the plurality of second wireless communication terminals may be allocated a sub-frequency band having any one bandwidth of 1.25 MHz, 2.5 MHz, 5 MHz, 10 MHz, and 20 MHz. At this point, the sub-frequency band is included in the entire frequency band and has a smaller bandwidth than that of the entire frequency band. In a detailed embodiment, when communicating with two of the second wireless communication terminals and using a 20 MHz frequency band, the first wireless communication terminal may respectively allocate sub-frequency bands having a 10 MHz bandwidth to the two second wireless communication terminals. Furthermore, when communicating with two of the second wireless communication terminals and using a 40 MHz frequency band, the first wireless communication terminal may respectively allocate sub-frequency bands having a 20 MHz bandwidth to the two second wireless communication terminals. In addition, when communicating with two of the second wireless communication terminals and using a 80 MHz frequency band, the first wireless communication terminal may respectively allocate sub-frequency bands having a 40 MHz bandwidth to the two second wireless communication terminals.

FIG. 7 illustrates channels allocated to wireless communication terminals in a 5 GHz band according to an embodiment of the present invention.

A 665 MHz frequency band from 5.170 GHz to 5.835 GHz is also the unlicensed ISM frequency band designated for an industry, science and medical use. A wireless communication terminal performing wireless LAN communication selects to use various non-overlapping channels in such a 5 GHz frequency band.

In the 5 GHz frequency band, channel numbers granted by the IEEE in a 5 MHz unit are used. At this point, a start frequency of a channel of number 34 is 5170 MHz and a start frequency of a channel of number 35 is 5175 MHz. In addition, a center frequency of a channel having a 20 MHz bandwidth in which channels of numbers 34 to 37 are combined is the same as a start frequency of a channel of number 36. Accordingly, the channel having 20 MHz bandwidth to which channels of number 34 to 37 are combined may be referred to as 20 MHz channel of number 36.

The wireless communication terminal may only use a non-overlapping 20 MHz channel such as channels of number 36, 40, and 44, and may not use a channel overlapping adjacent channels.

The existing 802.11ac standard defines that 20 MHz, 40 MHz, 80 MHz and 160 MHz bandwidths may be used in such a 5 GHz band. The wireless communication terminal according to an embodiment of the present invention may use channels having 20 MHz, 40 MHz, 80 MHz and 160 MHz bandwidths in the 5 GHz band.

Accordingly, when the first wireless communication terminal uniformly allocates frequency bandwidths to three or four of the second wireless communication terminals, the first wireless communication terminal may allocate a sub-frequency band having any one of 5 MHz, 10 MHz, 20 MHz, and 40 MHz bandwidths to each of the second wireless communication terminals.

In addition, when the first wireless communication terminal uniformly allocates frequency bandwidths to two of the second wireless communication terminals, the first wireless communication terminal may allocate a sub-frequency band having any one of 10 MHz, 20 MHz, and 40 MHz bandwidths to each of the second wireless communication terminals.

A detailed method will be described in relation to FIGS. 8 to 19 in which the first wireless communication terminal allocates a frequency band to the second wireless communication terminal.

Figure 8:
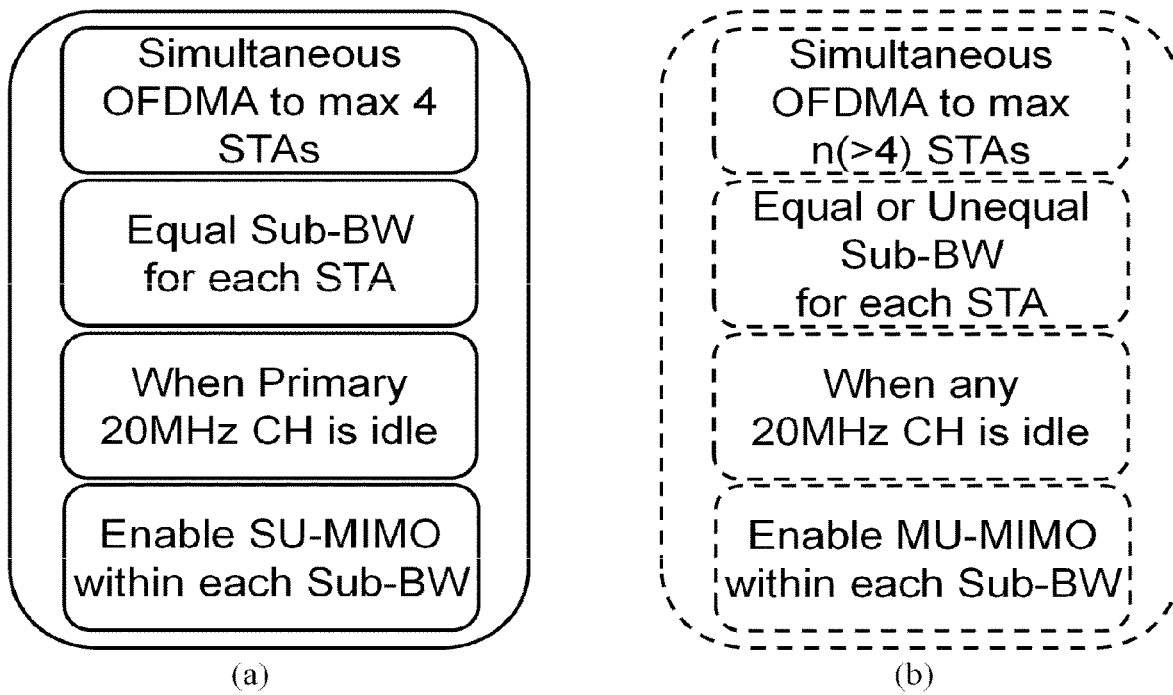
FIG. 8 illustrates a rule through which any one wireless communication terminal according to an embodiment of the present invention allocates a frequency band having a minimum unit frequency bandwidth to a plurality of wireless communication terminals.

FIG. 8 illustrates a rule through which any one wireless communication terminal allocates a frequency band having a minimum unit frequency bandwidth to a plurality of wireless communication terminals.

In a detailed embodiment, the first wireless communication terminal may transmit data to the plurality of second wireless communication terminals according to a following principle to be described in relation to FIG. 8(*a*).

The first wireless communication terminal may simultaneously transmit data up to 4 second wireless communication terminals at maximum. The 802.11ac standard or etc. having been defined before an embodiment of the present invention defines that any one wireless communication terminal may transmit data to 4 wireless communication terminals through multi-input multi-output (MIMO). Accordingly, when the first wireless communication terminal transmits data to the 4 second wireless communication terminals, a signaling field having been defined before may be used.

In addition, the first wireless communication terminal may allocate frequency bands having a uniform bandwidth to the plurality of respective second wireless communication terminals. In this case, the number of cases may be reduced for the frequency band allocated to each of plurality of second wireless communication terminals. Accordingly, the first wireless communication terminal may reduce a burden of signaling by allocating frequency bands having a uniform bandwidth to the plurality of respective second wireless communication terminals.

In addition, the first wireless communication terminal may transmit data to the plurality of second wireless communication terminals through a corresponding frequency band only when a primary channel having a minimum unit frequency band is idle in a frequency band used by the first wireless communication terminal. It is assumed that the primary channel is positioned in the lowest frequency band in the frequency band used by the first wireless communication terminal. At this point, when a physical frame of another BSS is transmitted in the primary channel, the second wireless communication terminal is not required to perform a clear channel assessment (CCA) on a secondary channel of a corresponding frequency band. This is because the first wireless communication terminal transmits data together with the primary channel of the corresponding frequency band to the plurality of second wireless communication terminals at all times. Accordingly, through this, the first wireless communication terminal may decrease a burden of CCA of the second wireless communication terminal.

In addition, in a detailed embodiment, the first wireless communication terminal may perform only single user (SU) MIMO transmission in a sub-frequency band. This is because that when the first wireless communication terminal performs multi user (MU) MIMO transmission in the sub-frequency band, the hardware complexity of the first wireless communication terminal may increase.

In another detailed embodiment, the first wireless communication terminal may transmit data to the plurality of second wireless communication terminals according to the following principle to be described in relation to FIG. 8(b).

The first wireless communication terminal may simultaneously transmit data to 4 or more second wireless communication terminals. However, in this case, a previously defined signaling field should be modified to be used.

Furthermore, the first wireless communication terminal may allocate frequency bands having non-uniform bandwidths to the plurality of respective second wireless communication terminals. However, in this case, the signaling complexity of the first wireless communication terminal increases for the second wireless communication terminal in comparison to a case where the first wireless communication terminal allocates frequency bands having a uniform bandwidth to the plurality of respective second wireless communication terminals.

In addition, the first wireless communication terminal may transmit data to the plurality of second wireless communication terminals through a corresponding frequency band, even when the primary channel having has the minimum unit frequency band is not idle in the frequency band used by the first wireless communication terminal. However, in this case, as described above, the second wireless communication terminal is required to perform the CCA on a sub-channel, even when a frame of another BSS is transmitted through the primary channel of the corresponding frequency band. Accordingly, a CCA burden of the second wireless communication terminal increases in comparison to that of the above-described embodiment.

Figure 9:
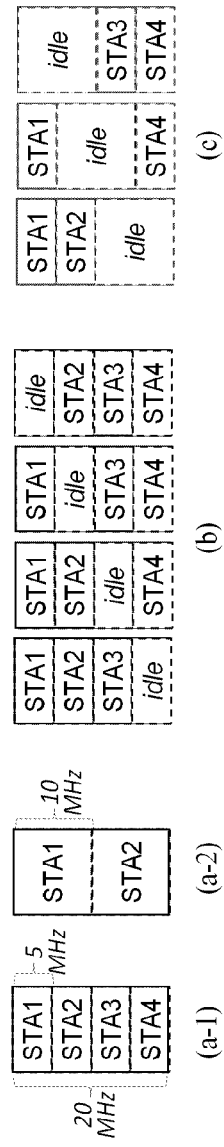
FIG. 9 illustrates that any one wireless communication terminal according to an embodiment of the present invention allocates a frequency band having a minimum unit frequency bandwidth to a plurality of wireless communication terminals.

Drawings after FIG. 9, according to at least any one of the plurality of principles having been described in relation to FIG. 8(a), a description will be provided about that the first wireless communication terminal transmits data to the plurality of second wireless communication terminals. However, according to a detailed embodiment, the first wireless communication terminal may amend any one of the plurality of principles having been described in relation to FIG. 8(a) into any one of the plurality of principles having been described in relation to FIG. 8(b), and transmit data.

As described above, the first wireless communication terminal may uniformly allocate a frequency band used by the first wireless communication terminal to the plurality of respective second wireless communication terminals. In detail, the first wireless communication terminal may allocate, to the plurality of respective second wireless communication terminals, frequency bands having a bandwidth obtained by dividing a bandwidth of the frequency band usable by the first wireless communication terminal by the number of the plurality of second wireless communication terminals. At this point, the number of the second wireless communication terminals may not be a divisor of an integer corresponding to the size of the bandwidth. In this case, the first wireless communication terminal may divide the bandwidth of the frequency band usable by the first wireless communication terminal by a specific integer to allocate the divided frequency bands to the plurality of respective second wireless communication terminals. At this point, the specific integer may be greater than and close to the number of the plurality of second wireless communication terminals. Alternatively, the specific integer may be the maximum number of the plurality of second wireless communication terminals.

A detailed description thereabout will be provided in relation to FIGS. 9 to 12.

FIG. 9 illustrates that any one wireless communication terminal allocates a frequency band having a minimum unit frequency bandwidth to a plurality of wireless communication terminals.

When the first wireless communication terminal uses a frequency band having the minimum unit frequency bandwidth and the number of the plurality of second wireless communication terminals is 4, the first wireless communication terminal may allocate frequency bands having a quarter of the minimum unit frequency bandwidth to the 4 respective second wireless communication terminals. For example, as in FIG. 9(a-1), when the minimum unit frequency bandwidth is 20 MHz and the number of the second wireless communication terminals is 4, the first wireless communication terminal may allocate frequency bands having a 5 MHz bandwidth to the 4 respective second wireless communication terminals.

In addition, when the first wireless communication terminal uses a frequency band having the minimum unit frequency bandwidth and the number of the plurality of second wireless communication terminals is 2, the first wireless communication terminal may allocate frequency bands having a half of the minimum unit frequency bandwidth to the 2 respective second wireless communication terminals. For example, as in FIG. 9(a-2), when the minimum unit frequency bandwidth is 20 MHz and the number of the second wireless communication terminals is 2, the first wireless communication terminal may allocate frequency bands having a 10 MHz bandwidth to the 2 respective second wireless communication terminals.

In addition, when the first wireless communication terminal uses a frequency band having the minimum unit frequency bandwidth and the number of the plurality of second wireless communication terminals is 3, the first wireless communication terminal may allocate frequency bands having a third of the minimum unit frequency bandwidth to the 3 respective second wireless communication terminals. For example, as in FIG. 9(b), when the minimum unit frequency bandwidth is 20 MHz and the number of the second wireless communication terminals is 3, the first wireless communication terminal may allocate frequency bands having a 5 MHz bandwidth to the 3 respective second wireless communication terminals.

Furthermore, the first wireless communication terminal may allocate, to the plurality of respective second wireless communication terminals, channels having a bandwidth obtained by dividing the minimum unit frequency bandwidth by the maximum number of the plurality of second wireless communication terminals. For example, as in FIG. 9(c), when the maximum number of the plurality of second wireless communication terminals is 4, the minimum unit frequency bandwidth is 20 MHz, and the number of the second wireless communication terminals is 2, the first wireless communication terminal may allocate frequency bands having a 5 MHz bandwidth to the 2 respective second wireless communication terminals. In this case, the frequency bandwidth allocated to the plurality of second wireless communication terminals may be uniform at all times. Accordingly, a burden that the first wireless communication terminal signals information about frequency band allocation to the second wireless communication terminals may be reduced. However, in this embodiment, when the maximum number of the plurality of second wireless communication terminals is smaller than a maximum value, a part of the frequency band usable by the first wireless communication terminal is not allocated to the plurality of second wireless communication terminals. Accordingly, the first wireless communication terminal wastes the frequency band.

Figure 10:
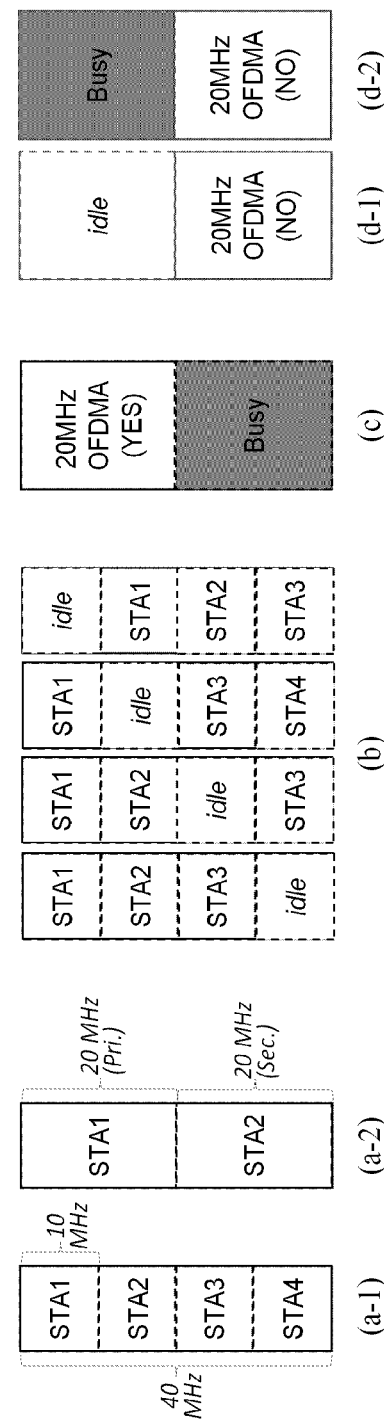
FIG. 10 illustrates that any one wireless communication terminal according to an embodiment of the present invention allocates a frequency band having a bandwidth double of a minimum unit frequency bandwidth to a plurality of wireless communication terminals.

FIG. 10 illustrates that any one wireless communication terminal according to an embodiment of the present invention allocates a frequency band having a bandwidth double of a minimum unit frequency bandwidth to a plurality of wireless communication terminals.

When the first wireless communication terminal uses the frequency band having the bandwidth double of the minimum unit frequency bandwidth and the number of the plurality of second wireless communication terminals is 4, the first wireless communication terminal may allocate frequency bands having a half of the minimum unit frequency bandwidth to the 4 respective second wireless communication terminals. For example, as in FIG. 10(a-1), when the minimum unit frequency bandwidth is 20 MHz and the number of the second wireless communication terminals is 4, the first wireless communication terminal may allocate frequency bands having a 10 MHz bandwidth to the 4 respective wireless communication terminals.

In addition, when the first wireless communication terminal uses a frequency band having a bandwidth double of the minimum unit frequency bandwidth and the number of the plurality of second wireless communication terminals is 2, the first wireless communication terminal may allocate frequency bands having the minimum unit frequency bandwidth to the 2 respective wireless communication terminals. For example, as in FIG. 10(a-2), when the minimum unit frequency bandwidth is 20 MHz and the number of the second wireless communication terminals is 2, the first wireless communication terminal may allocate frequency bands having a 20 MHz bandwidth to the 2 respective second wireless communication terminals.

In addition, when the first wireless communication terminal uses a frequency band having a bandwidth double of the minimum unit frequency bandwidth and the number of the plurality of second wireless communication terminals is 3, the first wireless communication terminal may allocate frequency bands having a half of the minimum unit frequency bandwidth to the 3 respective wireless communication terminals. For example, as in FIG. 10(b), when the minimum unit frequency bandwidth is 20 MHz and the number of the second wireless communication terminals is 3, the first wireless communication terminal may allocate frequency bands having a 10 MHz bandwidth to the 3 respective second wireless communication terminals. At this point, a frequency band of a 10 MHz bandwidth in the frequency band usable by the first wireless communication terminal does not become used.

In addition, as described above, when not able to use a primary channel having the minimum unit frequency bandwidth, the first wireless communication terminal may not transmit data to the plurality of second wireless communication terminals. In detail, as in an embodiment of FIG. 10(c), the primary channel having a 20 MHz bandwidth is idle and a secondary channel which has a 20 MHz bandwidth and is positioned next to the primary channel may not be idle. In this case, the first wireless communication terminal may transmit data to the plurality of second wireless communication terminals through the primary channel. However, as described in relation to FIG. 10(d-1), the first wireless communication terminal may not transmit data to the plurality of second wireless communication terminals not by using the primary channel, but by only using the secondary channel. In addition, as in an embodiment of FIG. 10(d-2), when the primary channels is not idle and the secondary channel is idle, the first wireless communication terminal may not transmit data to the plurality of second wireless communication terminals. This is for reducing a burden of a CCA operation to the plurality of second wireless communication terminals.

Figure 11:
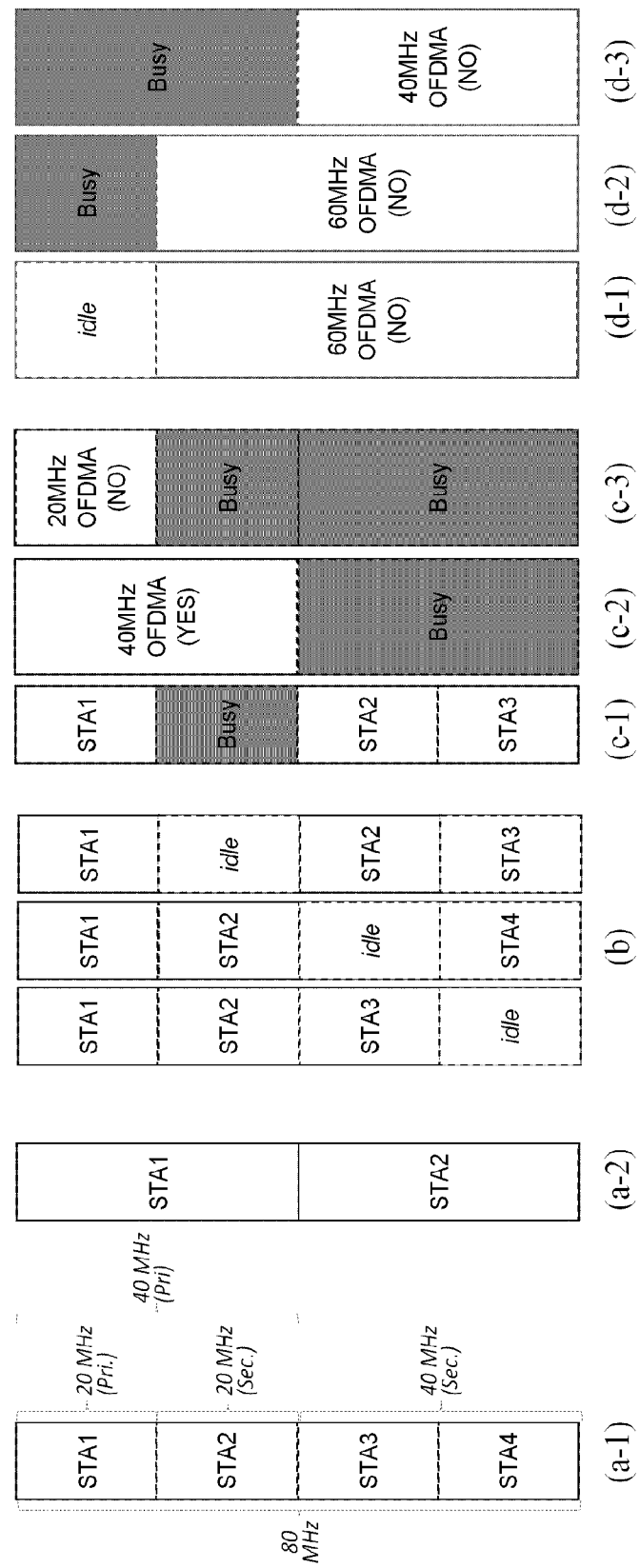
FIG. 11 illustrates that any one wireless communication terminal according to an embodiment of the present invention allocates a frequency band having a bandwidth quadruple of a minimum unit frequency bandwidth to a plurality of wireless communication terminals.

FIG. 11 illustrates that any one wireless communication terminal according to an embodiment of the present invention allocates a frequency band having a bandwidth quadruple of a minimum unit frequency bandwidth to a plurality of wireless communication terminals.

When the first wireless communication terminal uses a frequency band having a bandwidth quadruple of the minimum unit frequency bandwidth and the number of the plurality of second wireless communication terminals is 4, the first wireless communication terminal may allocate frequency bands having the minimum unit frequency bandwidth to the 4 respective wireless communication terminals. For example, as in FIG. 11(a-1), when the minimum unit frequency bandwidth is 20 MHz and the number of the second wireless communication terminals is 4, the first wireless communication terminal may allocate frequency bands having a 20 MHz bandwidth to the 4 respective wireless communication terminals.

In addition, when the first wireless communication terminal uses a frequency band having a bandwidth quadruple of the minimum unit frequency bandwidth and the number of the plurality of second wireless communication terminals is 2, the first wireless communication terminal may allocate frequency bands having a bandwidth double of the minimum unit frequency bandwidth to the 2 respective wireless communication terminals. For example, as in FIG. 11(a-2), when the minimum unit frequency bandwidth is 20 MHz and the number of the second wireless communication terminals is 2, the first wireless communication terminal may allocate frequency bands having a 40 MHz bandwidth to the 2 respective second wireless communication terminals.

In addition, when the first wireless communication terminal uses a frequency band having a bandwidth quadruple of the minimum unit frequency bandwidth and the number of the plurality of second wireless communication terminals is 3, the first wireless communication terminal may allocate frequency bands having the minimum unit frequency bandwidth to the 3 respective second wireless communication terminals. For example, as in FIG. 11(b), when the minimum unit frequency bandwidth is 20 MHz and the number of the second wireless communication terminals is 3, the first wireless communication terminal may allocate frequency bands having a 20 MHz bandwidth to the 3 respective second wireless communication terminals. At this point, a frequency band of the 20 MHz bandwidth in the frequency band usable by the first wireless communication terminal does not become used.

In addition, as described above, when not able to use a primary channel having the minimum unit frequency bandwidth, the first wireless communication terminal may not transmit data to the plurality of second wireless communication terminals. In detail, as embodiments of FIGS. 11(c-1), 11(c-2) and 11(c-3), the primary channel having a 20 MHz bandwidth is idle and the secondary channel may not be idle. In this case, the first wireless communication terminal may transmit data to the plurality of second wireless communication terminals through the primary channel and the idle secondary channel. However, as described in relation to FIG. 11(d-1), the first wireless communication terminal may not transmit data to the plurality of second wireless communication terminals not by using the primary channel, but by only using the secondary channel. In addition, as in embodiments of FIGS. 11(d-2) and 11(d-3), when the primary channels is not idle and the secondary channel is idle, the first wireless communication terminal may not transmit data to the plurality of second wireless communication terminals. This is for reducing a burden of a CCA operation to the plurality of second wireless communication terminals.

Figure 12:
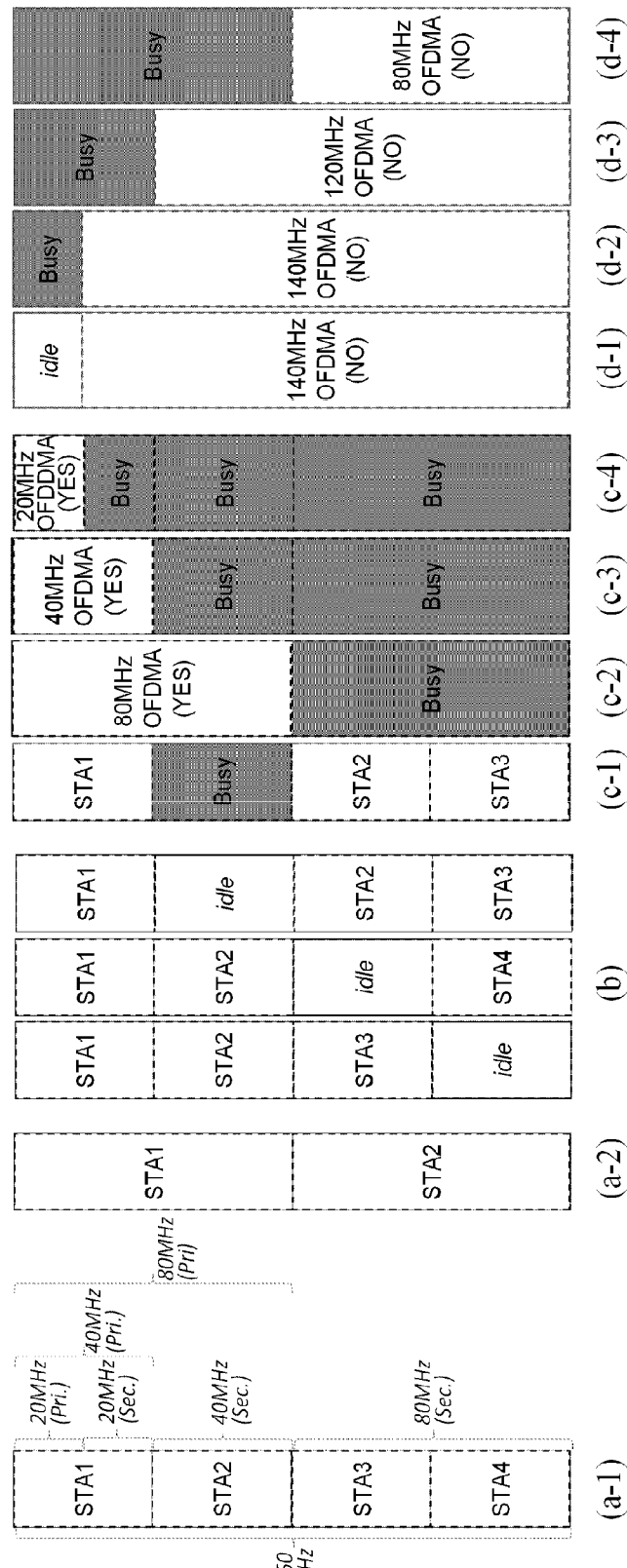
FIG. 12 illustrates that any one wireless communication terminal according to an embodiment of the present invention allocates a frequency band having a bandwidth octuple of a minimum unit frequency bandwidth to a plurality of wireless communication terminals.

FIG. 12 illustrates that any one wireless communication terminal according to an embodiment of the present invention allocates a frequency band having a bandwidth octuple of a minimum unit frequency bandwidth to a plurality of wireless communication terminals.

When the first wireless communication terminal uses a frequency band having a bandwidth octuple of the minimum unit frequency bandwidth and the number of the plurality of second wireless communication terminals is 4, the first wireless communication terminal may allocate frequency bands having a bandwidth double of the minimum unit frequency bandwidth to the 4 respective wireless communication terminals. For example, as in FIG. 12(a-1), when the minimum unit frequency bandwidth is 20 MHz and the number of the second wireless communication terminals is 4, the first wireless communication terminal may allocate frequency bands having a 40 MHz bandwidth to the 4 respective wireless communication terminals.

In addition, when the first wireless communication terminal uses a frequency band having a bandwidth octuple of the minimum unit frequency bandwidth and the number of the plurality of second wireless communication terminals is 2, the first wireless communication terminal may allocate frequency bands having a bandwidth quadruple of the minimum unit frequency bandwidth to the 2 respective wireless communication terminals. For example, as in FIG. 12(a-2), when the minimum unit frequency bandwidth is 20 MHz and the number of the second wireless communication terminals is 2, the first wireless communication terminal may allocate frequency bands having an 80 MHz bandwidth to the 2 respective second wireless communication terminals.

In addition, when the first wireless communication terminal uses a frequency band having a bandwidth octuple of the minimum unit frequency bandwidth and the number of the plurality of second wireless communication terminals is 3, the first wireless communication terminal may allocate frequency bands having the bandwidth double of the minimum unit frequency bandwidth to the 3 respective wireless communication terminals. For example, as in FIG. 12(b), when the minimum unit frequency bandwidth is 20 MHz and the number of the second wireless communication terminals is 3, the first wireless communication terminal may allocate frequency bands having a 40 MHz bandwidth to the 3 respective second wireless communication terminals. At this point, a frequency band of the 40 MHz bandwidth in the frequency band usable by the first wireless communication terminal does not become used.

In addition, as described above, when not able to use a primary channel having the minimum unit frequency bandwidth, the first wireless communication terminal may not transmit data to the plurality of second wireless communication terminals. In detail, as embodiments of FIGS. 12(d-1), 12(d-2), 12(d-3), and 12(d-4), the primary channel having a 20 MHz bandwidth is idle and the secondary channel may not be idle. In this case, the first wireless communication terminal may transmit data to the plurality of second wireless communication terminals through the primary channel and the idle secondary channel. However, as described in relation to FIG. 12(d-1), the first wireless communication terminal may not transmit data to the plurality of second wireless communication terminals not by using the primary channel, but by only using the secondary channel. In addition, as in embodiments of FIGS. 12(d-2), 12(d-3), and 12(d-4), when the primary channels is not idle and the secondary channel is idle, the first wireless communication terminal may not transmit data to the plurality of second wireless communication terminals. This is for reducing a burden of a CCA operation to the plurality of second wireless communication terminals.

In relation to FIGS. 9 to 12, descriptions have been provided about that the first wireless communication terminal allocates a uniform frequency bandwidth to each of the plurality of second wireless communication terminals. In relation to FIGS. 13 to 15, descriptions will be provided about that the first wireless communication terminal allocates non-uniform frequency bandwidths to the plurality of respective second wireless communication terminals.

Figure 13:
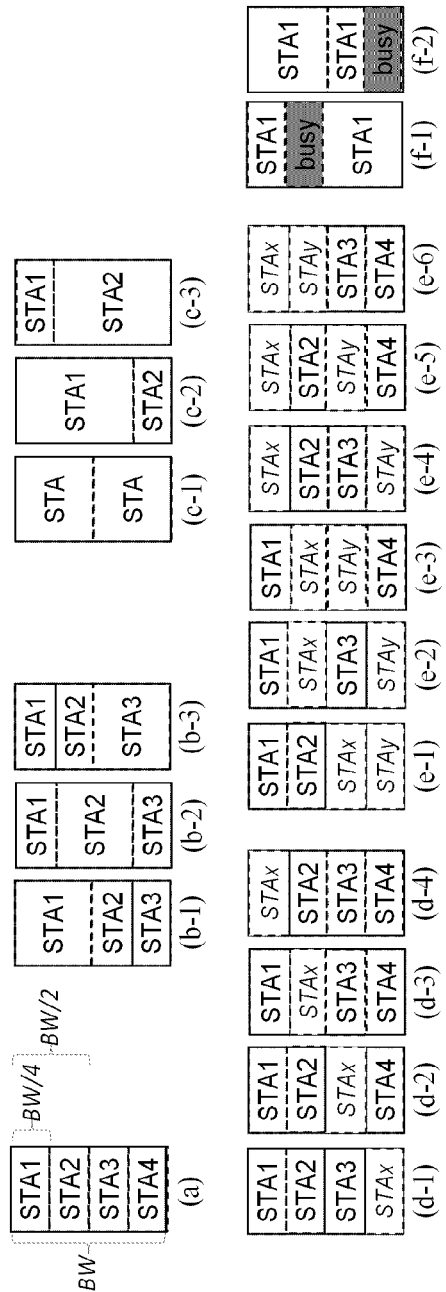
FIG. 13 illustrates that any one wireless communication terminal according to an embodiment of the present invention allocates contiguous sub-bands or non-contiguous sub-bands included in a frequency band to a plurality of stations.

FIG. 13 illustrates that any one wireless communication terminal according to an embodiment of the present invention allocates contiguous sub-bands or non-contiguous sub-bands included in a frequency band to a plurality of stations.

For an efficient use of the frequency band, the first wireless communication terminals may allocate frequency bands having non-uniform bandwidths to the plurality of respective second wireless communication terminals. In detail, the first wireless communication terminals may allocate contiguous frequency bands having non-uniform bandwidths to the plurality of respective second wireless communication terminals.

In detail, the first wireless communication terminal may allocate a frequency band to the plurality of respective second wireless communication terminals through the following process. First, the first wireless communication terminal obtains a basic allocation value by dividing a bandwidth of the frequency band usable by the first wireless communication terminal by the maximum number of the plurality of second wireless communication terminals. Thereafter, the first wireless communication terminal obtains the remainder value by excluding a multiplication of the number of the plurality of second wireless communication terminals and the basic allocation value from the bandwidth of the frequency band usable by the first wireless communication terminal. The first wireless communication terminal allocates the obtained remainder value to the plurality of second wireless communication terminals. At this point, the first wireless communication terminal may allocate the obtained remainder value on the basis of the size of data to be transmitted to each of the plurality of second wireless communication terminals. In detail, the first wireless communication terminal may allocate a frequency band corresponding to the obtained remainder value in proportion to the size of data to be transmitted to each of the plurality of second wireless communication terminals. In another detailed embodiment, the first wireless communication terminal may allocate the entire frequency band corresponding to the obtained remainder value to a second wireless communication terminal that will receive the largest data among the plurality of second wireless communication terminals.

This may be expressed as the following equations.

$$BWassign=BW/Nmax+BWadd$$

$$BWadd=f(BW-BW/Nmax \times n)$$

BWassign denotes a bandwidth of a frequency band allocated to an arbitrary second wireless communication terminal. BW denotes a bandwidth of a frequency band usable by the first wireless communication terminal. Nmax denotes the maximum value of the second wireless communication terminal. BWadd denotes a bandwidth of a frequency band additionally allocated to an arbitrary second wireless communication terminal. At this point, f(a) denotes a function for allocating a remaining frequency band and n denotes the number of the plurality of second wireless communication terminals. As described above, the function for allocating the remaining frequency band may allocate the remaining frequency band to each of the plurality of the second wireless communication terminals on the basis of the size of data to be transmitted to each of the plurality of second wireless communication terminals.

In an embodiment of FIG. 13, the maximum number of the second wireless communication terminals is 4.

As an embodiment of FIG. 13(*a*), when the number of the plurality of second wireless communication terminals is 4, the first wireless communication terminal may uniformly divide a frequency band BW usable by itself by 4 and allocate the 4 divided frequency bands to the plurality of respective second wireless communication terminals.

In addition, as embodiments of FIGS. 13(*b*-1), 13(*b*-2) and 13(*b*-3), when the number of the plurality of second wireless communication terminals is 3, the first wireless communication terminal may non-uniformly divide the frequency band BW usable by the first wireless communication terminal and allocate the divided frequency bands to the plurality of respective second wireless communication terminals. In detail, as the embodiments of FIGS. 13(*b*-1), 13(*b*-2) and 13(*b*-3), a bandwidth of a frequency band of any one second wireless communication terminal may be double of the bandwidth of frequency bands of the other two second wireless communication terminals.

In addition, as an embodiment of FIG. 13(*c*-1), when the number of the plurality of second wireless communication terminals is 2, the first wireless communication terminal may allocate frequency bands having a uniform bandwidth to the plurality of respective second wireless communication terminals.

As embodiments of FIGS. 13(*c*-2) and 13(*c*-3), when the number of the plurality of second wireless communication terminals is 2, the first wireless communication terminal may allocate frequency bands having non-uniform bandwidths to the plurality of respective second wireless communication terminals.

The description has been provided about that the first wireless communication terminal allocates contiguous frequency bands to the plurality of respective second wireless communication terminals through FIGS. 13(*a*), 13(*b*) and 13(*c*). A description will be provided about that the first wireless communication terminal allocates contiguous frequency bands to the plurality of respective second wireless communication terminals through FIGS. 13(*d*), 13(*e*) and 13(*f*).

As embodiments of FIGS. 13(*d*-1), 13(*d*-2), 13(*d*-3) and 13(*d*-4), when the number of the plurality of second wireless communication terminals is 3, the first wireless communication terminal divides uniformly the frequency band BW usable by itself by 4 and allocates, one to one, the divided frequency bands to the 3 second wireless communication terminals. The first wireless communication terminal may allocate the remaining frequency band to any one of the second wireless communication terminals on the basis of data to be transmitted to the three second wireless communication terminals as described above. At this point, the first wireless communication terminal may allocate non-contiguous frequency bands to the second wireless communication terminals. For example, in the embodiment of FIG. 13(*d*-1), a frequency band indicated as STAx may be allocated to a first station STA1 or a second station STA2.

As embodiments of FIGS. 13(*e*-1), 13(*e*-2), 13(*e*-3), 13(*e*-4), 13(*e*-5), and 13(*e*-6), when the number of the plurality of second wireless communication terminals is 2, the first wireless communication terminal divides uniformly the frequency band BW usable by the first wireless communication terminal by 4 and allocates, one to one, the divided frequency bands to the 2 second wireless communication terminals. The first wireless communication terminal may uniformly allocate the remaining frequency bands to the 2 second wireless communication terminals or allocate the entire remaining frequency bands to any one second wireless communication terminal. At this point, the first wireless communication terminal may allocate non-contiguous frequency bands to the second wireless communication terminals as in the embodiment of FIG. 13(*d*).

As in an embodiment of FIG. 13(*f*), when the number of the second wireless communication terminal is 1 and the secondary channel, not the primary channel, is not idle, the first wireless communication terminal may allocate all idle bands to the one second wireless communication terminal.

Figure 14:
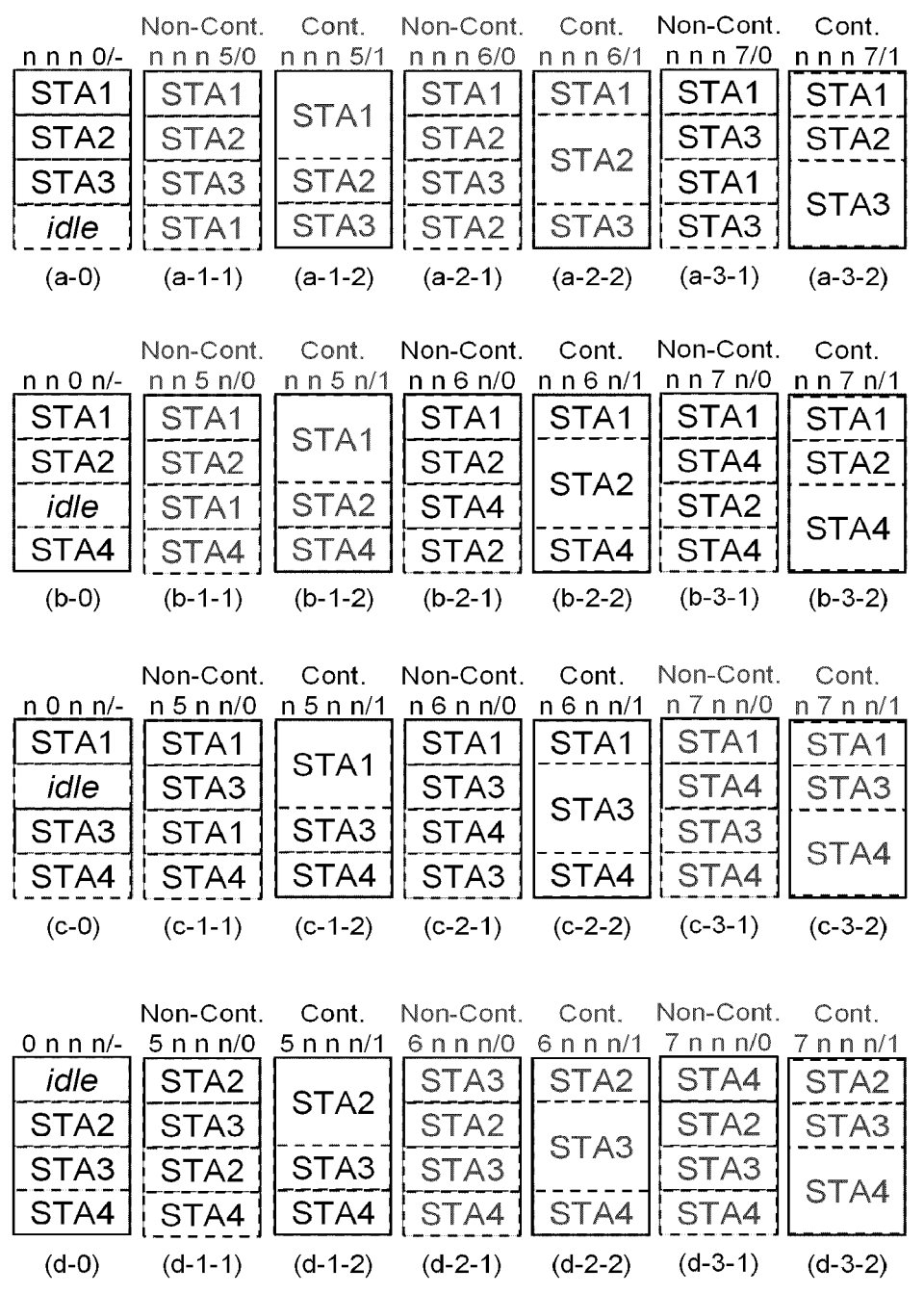

FIG. 14 illustrates that any one wireless communication terminal according to an embodiment of the present invention allocates a frequency band to three wireless communication terminals.

FIG. 14 shows that the first wireless communication terminal allocates contiguous bands or non-contiguous bands to 3 second wireless communication terminals according to the wireless frequency allocation method having been described in relation to FIG. 13. FIG. 14(*a*-0), FIG. 14(*b*-0), FIG. 14(*c*-0) and FIG. 14(*d*-0) show embodiments in which the first wireless communication terminal does not allocate a part of the frequency band to the plurality of second wireless communication terminals. In addition, FIG. 14(*a*-1-1), FIG. 14(*a*-1-2), FIG. 14(*b*-1-1), FIG. 14(*b*-1-2), and FIG. 14(*c*-1-1). FIG. 14(*c*-1-2), FIG. 14(*d*-1-1), and FIG. 14(*d*-1-2) show cases where the first wireless communication terminal allocates more frequency bands to the first station STA1 than to other second wireless communication terminals. In addition, FIG. 14(*a*-2-1), FIG. 14(*a*-2-2), FIG.

14(*b*-2-1), FIG. 14(*b*-2-2), and FIG. 14(*c*-2-1). FIG. 14(*c*-2-2), FIG. 14(*d*-2-1), and FIG. 14(*d*-2-2) show cases where the first wireless communication terminal allocates more frequency bands to the second station STA2 than to other second wireless communication terminals. In addition, FIG. 14(*a*-3-1), FIG. 14(*a*-3-2), FIG. 14(*b*-3-1), FIG. 14(*b*-3-2), and FIG. 14(*c*-3-1). FIG. 14(*c*-3-2), FIG. 14(*d*-3-1), and FIG. 14(*d*-3-2) show cases where the first wireless communication terminal allocates more frequency bands to a third station STA3 than to other second wireless communication terminals.

Figure 15:
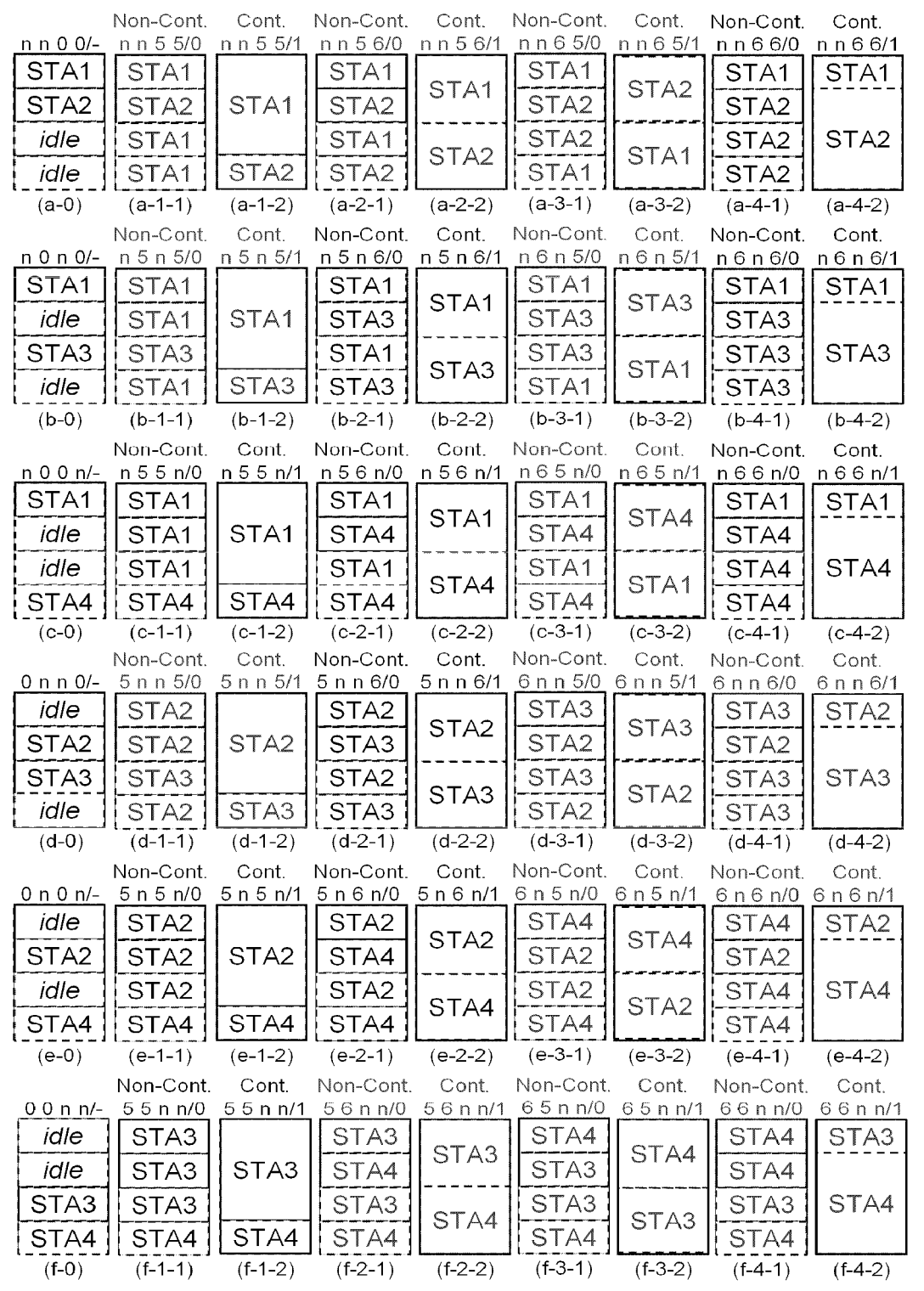

FIG. 15 shows that the first wireless communication terminal allocates contiguous bands or non-contiguous bands to 2 second wireless communication terminals according to the wireless frequency allocation method having been described in relation to FIG. 13. FIG. 15(*a*-0), FIG. 15(*b*-0), FIG. 15(*c*-0) and FIG. 15(*d*-0) show embodiments in which the first wireless communication terminal does not allocate a part of the frequency band to the plurality of second wireless communication terminals. In addition, FIG. 15(*a*-1-1), FIG. 15(*a*-1-2), FIG. 15(*a*-4-1), FIG. 15(*a*-4-2), FIG. 15(*b*-1-1), FIG. 15(*b*-1-2), FIG. 15(*b*-4-1), FIG. 15(*b*-4-2), FIG. 15(*c*-1-1). FIG. 15(*c*-1-2), FIG. 15(*c*-4-1). FIG. 15(*c*-4-2), FIG. 15(*d*-1-1), FIG. 15(*d*-1-2), FIG. 15(*d*-4-1), and FIG. 15(*d*-4-2) show cases where the first wireless communication terminal allocates a greater frequency band to any one second wireless communication terminal than to the other second wireless communication terminals. In addition, FIG. 15(*a*-2-1), FIG. 15(*a*-2-2), FIG. 15(*a*-3-1), FIG. 15(*a*-3-2), FIG. 15(*b*-1-2), FIG. 15(*b*-2-2), FIG. 15(*b*-3-1), FIG. 15(*b*-3-2), FIG. 15(*c*-2-1). FIG. 15(*c*-2-2), FIG. 15(*c*-3-1). FIG. 15(*c*-3-2), FIG. 15(*d*-2-1), FIG. 15(*d*-2-2), 15(*d*-3-1), and FIG. 15(*d*-3-2) show cases where the first wireless communication terminal allocates frequency bands having a uniform bandwidth to two wireless communication terminals.

In relation to FIGS. 15 to 19, descriptions will be provided about that when a part of frequency band usable by the first wireless communication terminal is not idle, the first wireless communication terminal allocates a frequency band to the plurality of second wireless communication terminals.

FIG. 15 illustrates that any one wireless communication terminal according to an embodiment of the present invention allocates a frequency band to two wireless communication terminals.

As described above, the first wireless communication terminal may allocate a frequency band having a minimum unit frequency bandwidth to the plurality of second wireless communication terminals. At this point, the number of the plurality of second wireless communication terminals may be any one of 4, 3 and 2.

As described above, when a primary channel having the minimum unit frequency bandwidth in the frequency band is idle, the first wireless communication terminal may transmit data to the plurality of second wireless communication terminals through the corresponding band. Accordingly, as the embodiments of FIG. 15(*b*-1), FIG. 15(*b*-2), and FIG. 15(*b*-3), even if a secondary channel positioned next to the minimum frequency unit bandwidth is not idle, the first wireless communication terminal may allocate the frequency band having the minimum frequency unit bandwidth to the plurality of second wireless communication terminals.

Figure 16:
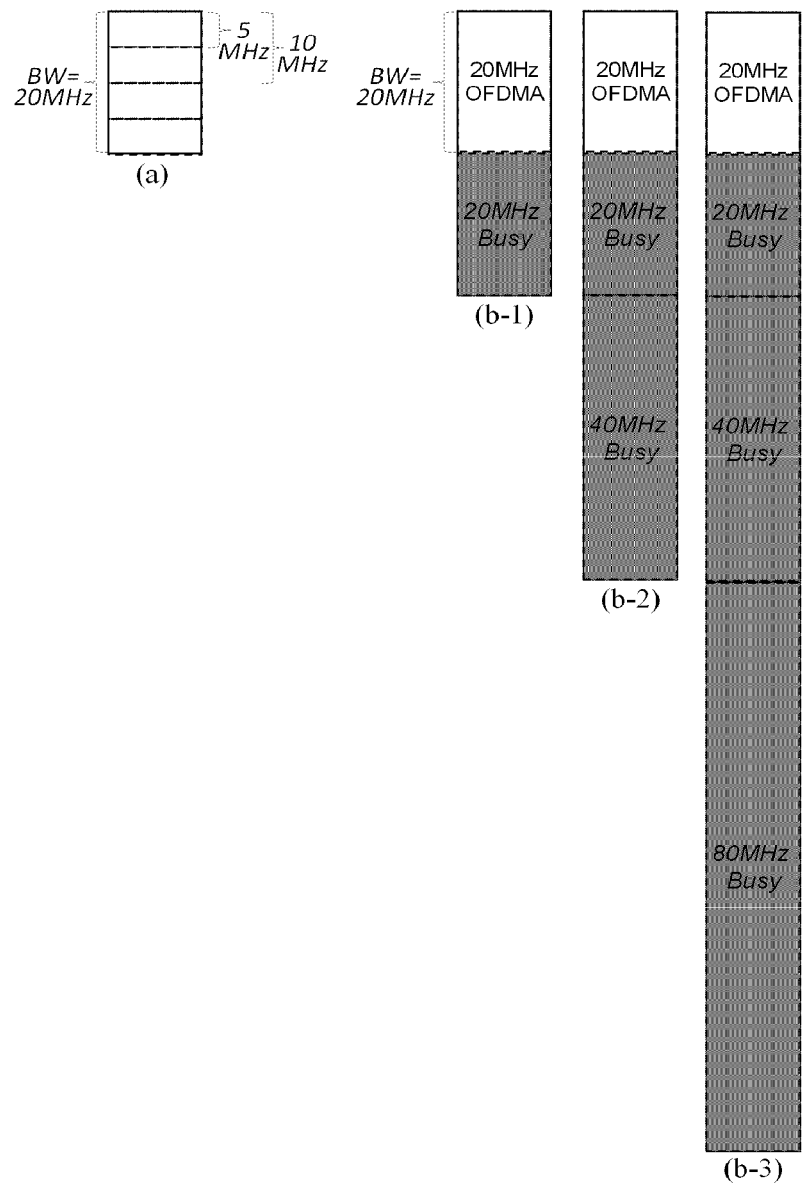
FIG. 16 illustrates that any one wireless communication terminal according to an embodiment of the present invention allocates a primary channel having a minimum unit frequency bandwidth to a plurality of wireless communication terminals.

FIG. 16 illustrates that any one wireless communication terminal according to an embodiment of the present invention allocates a primary channel having a minimum unit frequency bandwidth to a plurality of wireless communication terminals.

Figure 17:
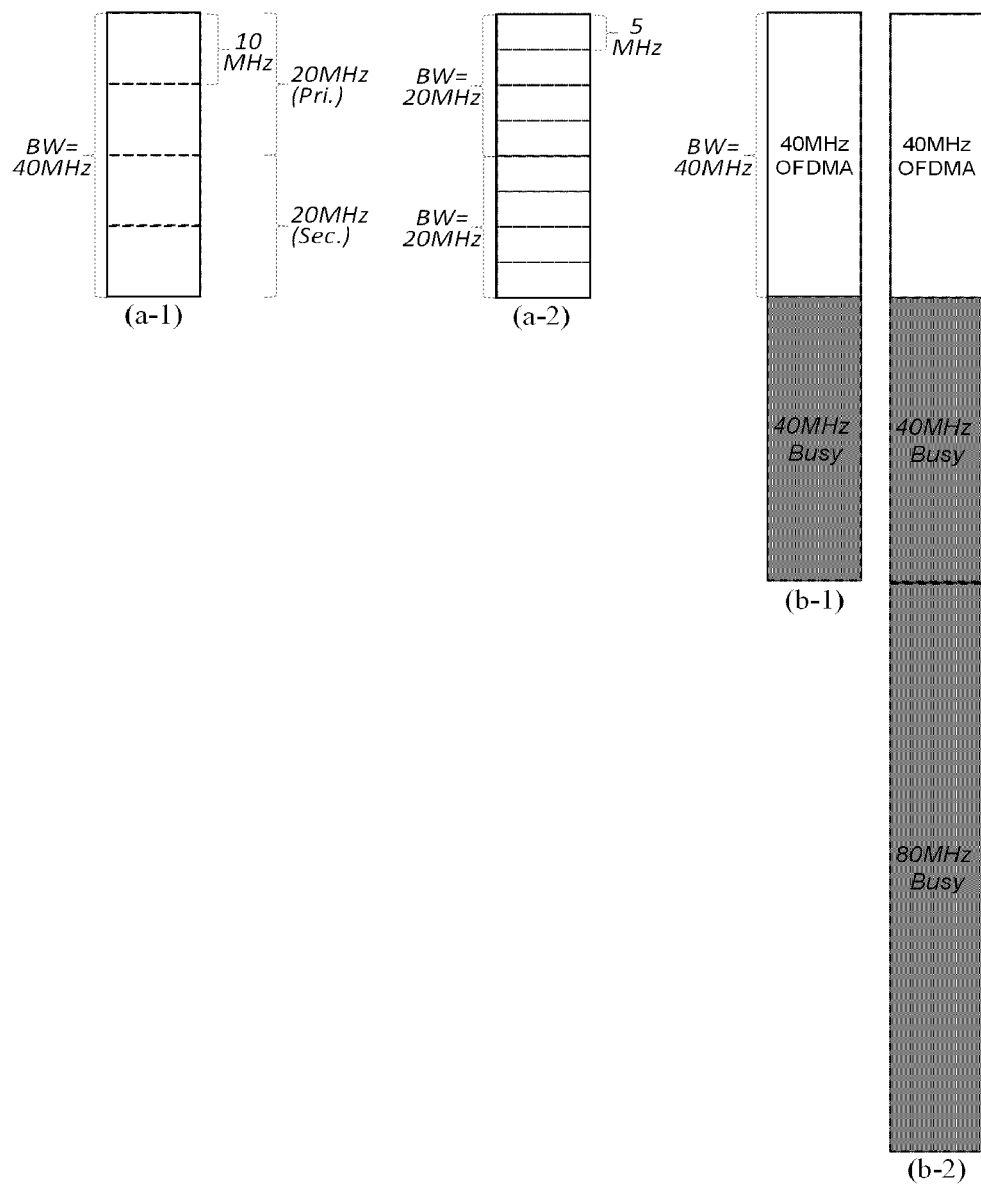
FIG. 17 illustrates that any one wireless communication terminal according to an embodiment of the present invention allocates a frequency band having a bandwidth double of a minimum unit frequency bandwidth and including a primary channel to a plurality of wireless communication terminals.

FIG. 17 illustrates that any one wireless communication terminal according to an embodiment of the present invention allocates a frequency band having a bandwidth double of a minimum unit frequency bandwidth and including a primary channel to a plurality of wireless communication terminals.

As described above, the first wireless communication terminal may allocate the frequency band having the bandwidth double of the minimum unit frequency bandwidth to the plurality of second wireless communication terminals. At this point, the number of the plurality of second wireless communication terminals may be any one of 4, 3 and 2.

At this point, as in an embodiment of FIG. 17(*a*-1), the first wireless communication terminal may uniformly divide a frequency bandwidth usable by the first wireless communication terminal and allocate the divided contiguous frequency bands to the plurality of respective second wireless communication terminals.

In addition, the first wireless communication terminal may uniformly divide the frequency bandwidth usable by the first wireless communication terminal to allocate the divided non-contiguous frequency bands to the plurality of respective second wireless communication terminals. In detail, as in an embodiment of FIG. 17(*a*-2), the first wireless communication terminal uniformly allocates first the frequency band having the minimum unit frequency bandwidth to the plurality of second wireless communication terminals, and then the remaining frequency band having the minimum unit frequency bandwidth to the plurality of second wireless communication terminals. In this case, the plurality of second wireless communication terminals are respectively allocated non-contiguous frequency bands.

As described above, when a primary channel having the minimum unit frequency bandwidth in the frequency band is idle, the first wireless communication terminal may transmit data to the plurality of second wireless communication terminals through the corresponding frequency band. Accordingly, as embodiments of FIG. 17(*b*-1) and FIG. 17(*b*-2), even if a secondary channel positioned next to the frequency band including the primary channel is not idle, the first wireless communication terminal may allocate the frequency band having the minimum frequency unit bandwidth to the plurality of second wireless communication terminals.

Figure 18:
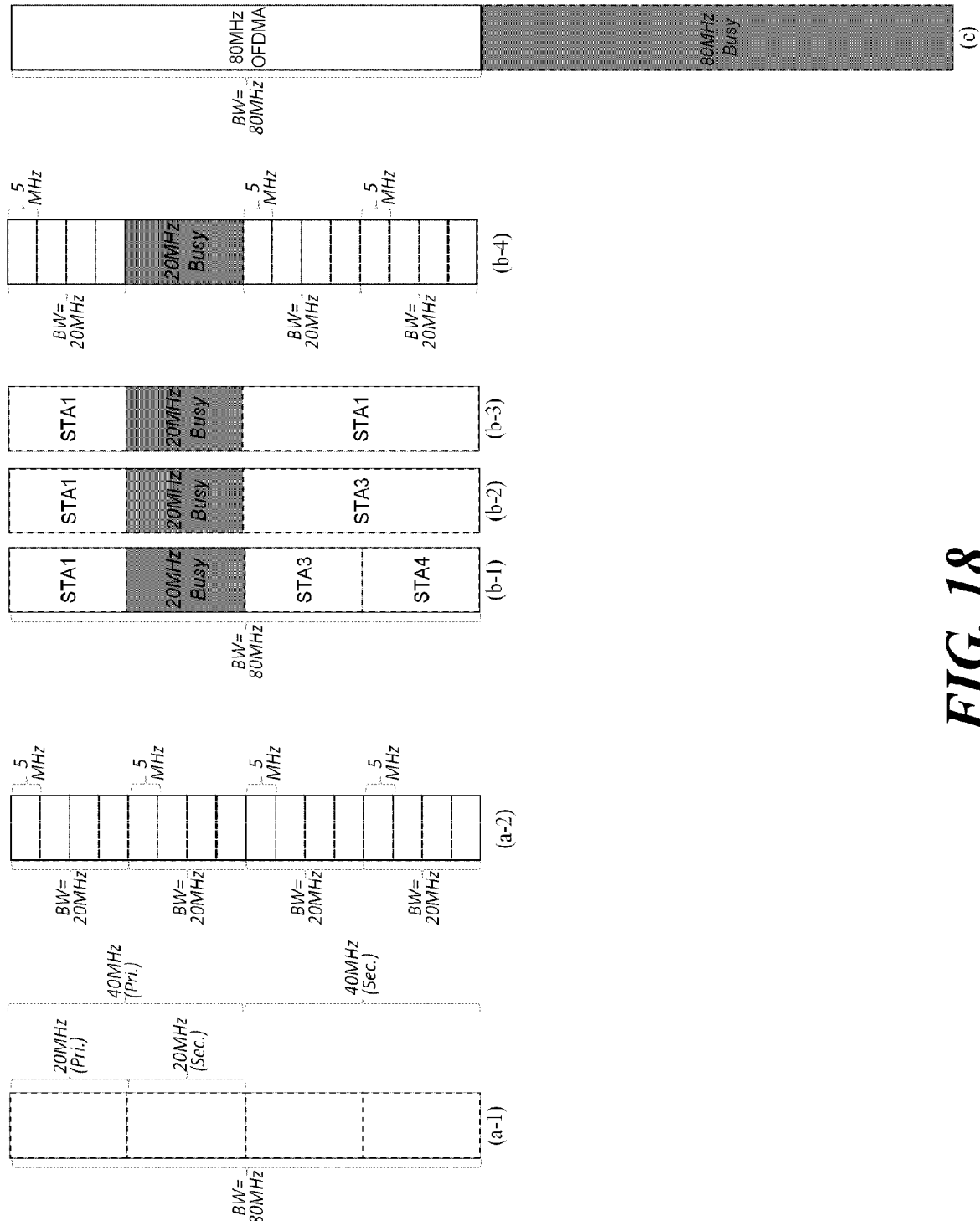
FIG. 18 illustrates that any one wireless communication terminal according to an embodiment of the present invention allocates a frequency band having a bandwidth quadruple of a minimum unit frequency band to a plurality of wireless communication terminals.

FIG. 18 illustrates that any one wireless communication terminal according to an embodiment of the present invention allocates a frequency band having a bandwidth quadruple of a minimum unit frequency bandwidth to a plurality of wireless communication terminals.

As described above, the first wireless communication terminal may allocate a frequency band having a bandwidth quadruple of the minimum unit frequency bandwidth to the plurality of second wireless communication terminals. At this point, the number of the plurality of second wireless communication terminals may be any one of 4, 3 and 2.

At this point, as an embodiment of FIG. 18(*a*-1), the first wireless communication terminal may divide a frequency bandwidth usable by the first wireless communication terminal and allocate the divided contiguous frequency bands to the plurality of respective second wireless communication terminals.

In addition, the first wireless communication terminal may uniformly divide the frequency bandwidth usable by the first wireless communication terminal and allocate the divided non-contiguous frequency bands to the plurality of respective second wireless communication terminals. In detail, an in an embodiment of FIG. 18(*a*-2), the first wireless communication terminal may divide the frequency band usable by the first wireless communication terminal by 4, and uniformly allocate the divided 4 frequency bands to the plurality of respective wireless communication terminals. In this case, non-contiguous frequency bands are allocated to the plurality of respective second wireless communication terminals.

As described above, when the primary channel having the minimum unit frequency bandwidth in the frequency band is idle, the first wireless communication terminal may transmit data to the plurality of second wireless communication terminals through the corresponding frequency band. Accordingly, as in embodiments of FIG. 18(*b*-1), FIG. 18(*b*-2), FIG. 18(*b*-3), and FIG. 18(*b*-4), even when any one secondary channel in the frequency band is not idle, when the primary channel is idle, the first wireless communication terminal may transmit data to the plurality of second wireless communication terminals through the corresponding frequency band.

Figure 19:
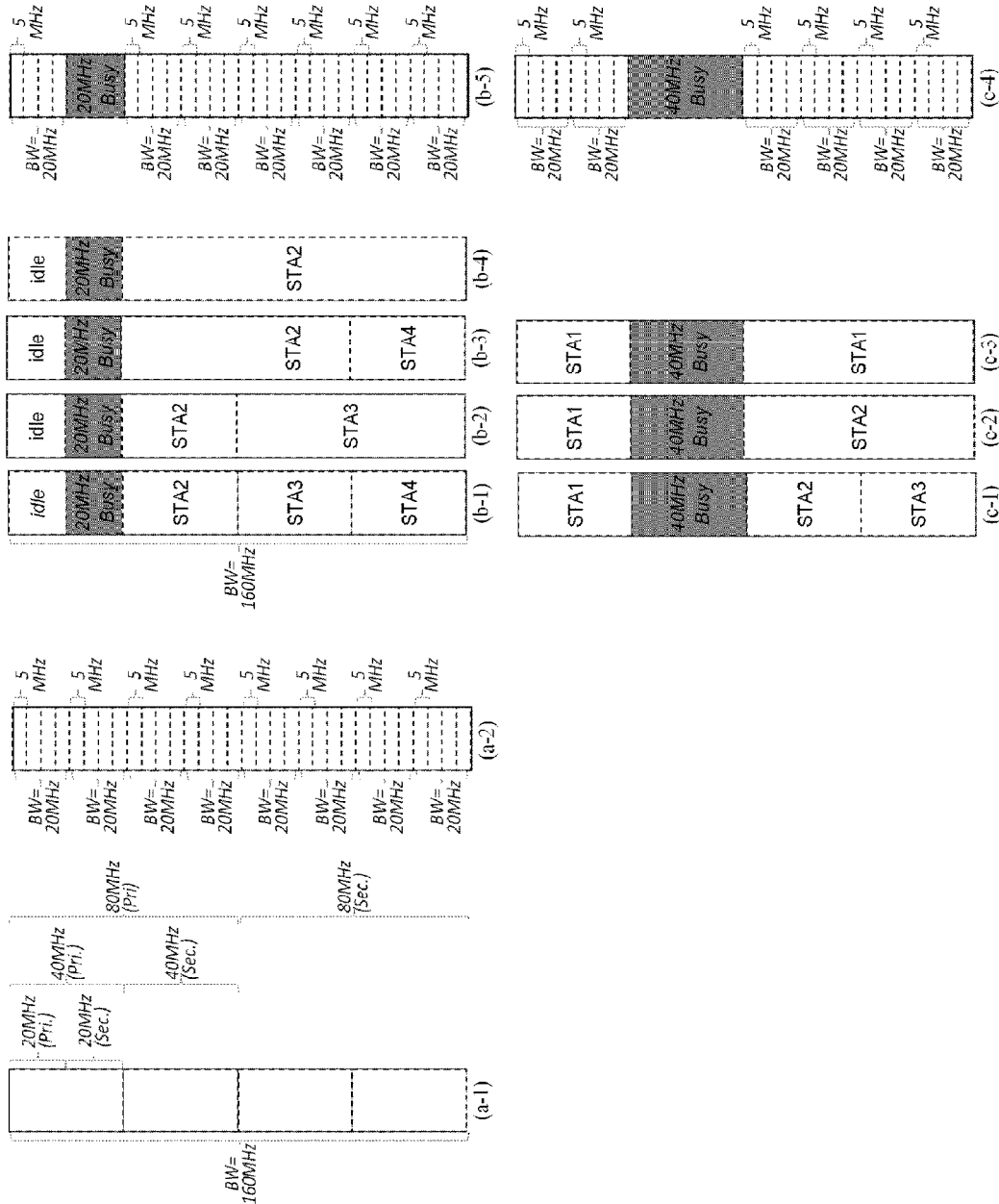
FIG. 19 illustrates that any one wireless communication terminal according to an embodiment of the present invention allocates a frequency band having a bandwidth octuple of a minimum unit frequency band to a plurality of wireless communication terminals.

FIG. 19 illustrates that any one wireless communication terminal according to an embodiment of the present invention allocates a frequency band having a bandwidth octuple of the minimum unit frequency bandwidth to a plurality of wireless communication terminals.

As described above, the first wireless communication terminal may allocate a frequency band having a bandwidth octuple of the minimum unit frequency bandwidth to the plurality of second wireless communication terminals. At this point, the number of the plurality of second wireless communication terminals may be any one of 4, 3 and 2.

At this point, as an embodiment of FIG. 19(*a*-1), the first wireless communication terminal may uniformly divide a frequency bandwidth usable by the first wireless communication terminal and allocate contiguous divided frequency bands to the plurality of respective second wireless communication terminals.

In addition, the first wireless communication terminal may uniformly divide the frequency bandwidth usable by the first wireless communication terminal and allocate the divided non-contiguous frequency bands to the plurality of respective second wireless communication terminals. In detail, as in an embodiment of FIG. 19(*a*-2), the first wireless communication terminal may divide the frequency band usable by itself into 8 frequency bands, and uniformly allocate the divided 8 frequency bands to the plurality of respective wireless communication terminals. In this case, non-contiguous frequency bands are allocated to the plurality of respective second wireless communication terminals.

As described above, when the primary channel having the minimum unit frequency bandwidth in the frequency band is idle, the first wireless communication terminal may transmit data to the plurality of second wireless communication terminals through the corresponding frequency band. Accordingly, as in embodiments of FIG. 19(*b*-1), FIG. 19(*b*-2), FIG. 19(*b*-3), FIG. 19(*b*-4), FIG. 19(*b*-5), FIG. 19(*c*-1), FIG. 19(*c*-2), FIG. 19(*c*-3), and FIG. 19(*c*-4), even when any one secondary channel in the frequency band is not idle, when the primary channel is idle, the first wireless communication terminal may transmit data to the plurality of second wireless communication terminals through the corresponding frequency band.

In relation to FIGS. 8 to 19, descriptions have been provided about that the first wireless communication terminal allocates the frequency band to the plurality of second wireless communication terminals. A physical frame structure for signaling the frequency band allocated through this method will be described in relation to FIGS. 20 to 26.

Figure 20:
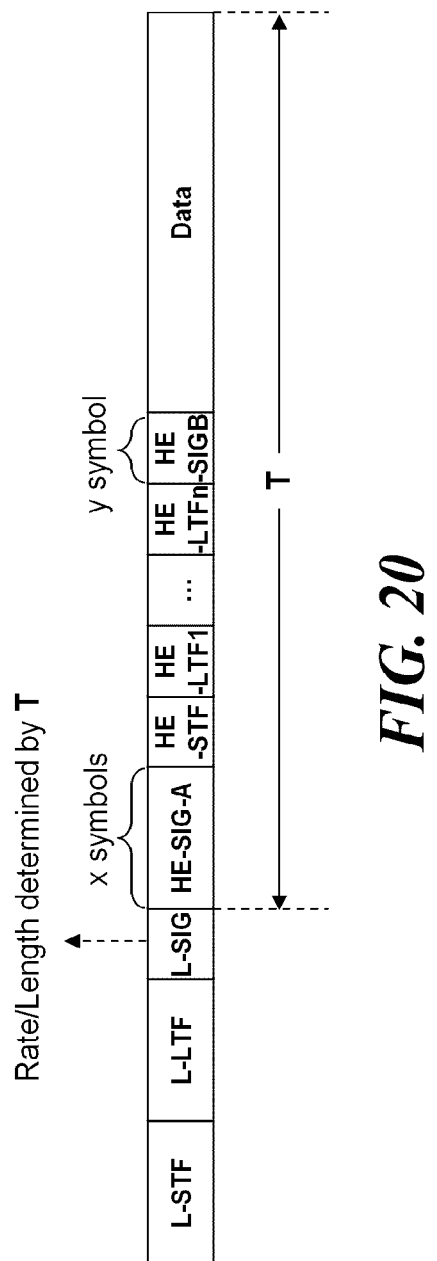
FIG. 20 illustrates a physical frame format according to an embodiment of the present invention.

FIG. 20 illustrates a physical frame format according to an embodiment of the present invention.

The physical frame that is transmitted by a wireless communication terminal according to an embodiment of the present invention includes an L-STF field, an L-LTF field, an L-SIG field, an HE-SIG-A field, an HE-STF field, an HE-LTF field, and an HE-SIG-B field.

The L-STF field indicates a short training signal decodable by all of a wireless communication terminal that supports embodiments of the present invention and a wireless communication terminal that does not support the embodiments of the present invention. The training signal is a signal for assisting a wireless communication terminal in demodulation and decoding setting for receiving a signal to be transmitted after transmission of the training signal. The short training signal is a training signal having a relatively short length. In detail, on the basis of the short training signal, the wireless communication terminal may perform an automatic gain control (AGC) on an OFDM symbol including an L-LTF field and an L-SIG field and synchronize a timing and frequency with an OFDM symbol including an L-SIG field.

The L-LTF field indicates a long training signal decodable by all of a wireless communication terminal that supports embodiments of the present invention and a wireless communication terminal that does not support the embodiments of the present invention. The long training signal is a training signal having a relatively long length. In detail, the wireless communication terminal may estimate a fine frequency offset and a channel of an OFDM symbol including an L-SIG field on the basis of the long training signal.

The L-SIG field is signaling information decodable by all of a wireless communication terminal that supports embodiments of the present invention and a wireless communication terminal that does not support the embodiments of the present invention. In detail, the L-SIG field indicates information about a data rate and a data length.

The HE-SIG-A field signals information commonly applied to the plurality of second wireless communication terminals. A description thereabout will be provided in relation to FIGS. 21 to 24.

The HE-STF field indicates a short training signal decodable by a wireless communication terminal supporting the embodiments of the present invention. A wireless communication terminal supporting the embodiments of the present invention may perform an AGC on an OFDM symbol including an HE-LTE field, an HE-SIG-B field and data included in a payload on the basis of a short training signal. In addition, a wireless communication terminal supporting the embodiments of the present invention may perform synchronization on a timing and frequency of an OFDM symbol including an HE-LTE field, an HE-SIG-B field and data included in a payload on the basis of a short training signal.

The HE-LTF field indicates a long training signal decodable by a wireless communication terminal supporting the embodiments of the present invention. The wireless communication terminal supporting the embodiments of the present invention may estimate a fine frequency offset and channel of an OFDM symbol including an HE-SIG-B filed and data included in a payload on the basis of a long training signal.

The HE-SIG-B field signals information about the plurality of second wireless communication terminals.

The HE-SIG-A field may be represented with the length of an OFDM x symbol and the HE-SIG-B field may represented with the length of an OFDM y symbol. At this point, as a value of x increases, the number of second wireless communication terminals to which the first wireless communication terminal may transmit data increases. In detail, according to the x value, the number of second wireless communication terminals to which the first wireless communication terminal may transmit data may be any one of 4, 8, 12, and 16. In addition, the variable number of HE-LTF fields may be transmitted according to the number of spatial streams of the first and second wireless communication terminals.

The second wireless communication terminal having received a physical frame may obtain the duration of the physical frame on the basis of an L-SIG field. In detail, the second wireless communication terminal may obtain information about the data rate and data length from the L-SIG field to obtain a transmission time of a physical frame appearing thereafter.

A minimum data transmission rate is assumed to be 6 Mbps and since a maximum length of the physical frame is 1366 symbols, the entire maximum transmission time from the HE-SIG-A field to the data field may be limited to 5.464 ms.

Figure 21:
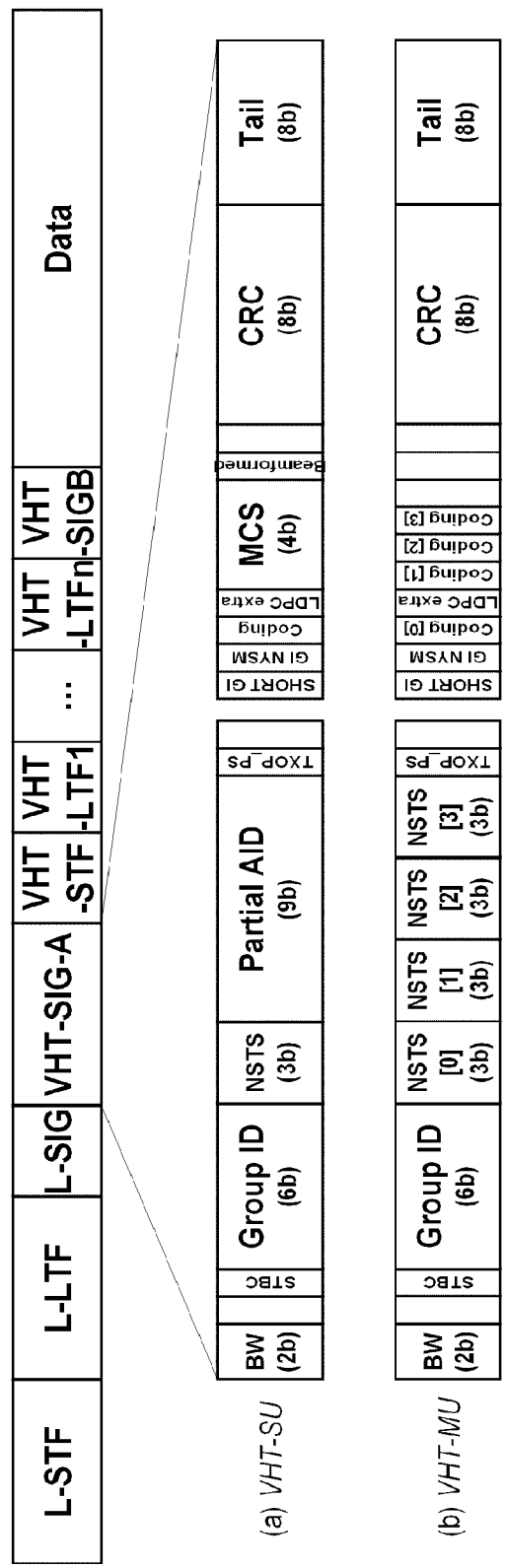
FIG. 21 illustrates a format of an SIG-A field according to an embodiment of the present invention.

FIG. 21 illustrates a format of an SIG-A field according to an embodiment of the present invention.

The SIG-A field according to an embodiment of the present invention supports a downlink multi user-multi input multi output (MU-MIMO). Accordingly, the configuration of the SIG-A field becomes differed according to whether a physical frame is a frame for a signal user (SU) or for multiple users (MU).

The physical frame for the SU may include at least one of a BW field, an STBC field, a Group ID field, an NSTS field, a Partial AID field, a TXOP_PS field, a SHORT GI field, a GI_NYSM field, a Coding field, an LDPC extra field, an MCS field, a Beamformed field, a CRC field, and a Tail field.

The BW field indicates a bandwidth of a frequency band in which the physical frame is transmitted. In a detailed embodiment, the BW field may indicate 20 MHz, 40 MHz, 80 MHz, and 160 MHz.

The STBC field indicates whether space time block coding is applied.

The Group ID field indicates whether the physical frame is for the SU. In detail, when a value of the Group ID field is a specific value, the value may indicate that the physical frame is for the SU. At this point, the specific value may be at least any one of 0 and 63.

The NSTS field indicates the number of spatial time streams to be transmitted to the second wireless communication terminals. At this point, the number of LTF field transmissions becomes differed according to the number of spatial time streams. When the number of spatial time streams is 1, 2, 4, 6 or 8, the number of the LTE fields to be transmitted will be respectively 1, 2, 4, 6 or 8. In addition, when the number of spatial time streams is 3, 5, or 7, the number of the LTE fields to be transmitted will be respectively 4, 6 or 8.

The Partial AID field indicates a partial association ID (AID) of the second wireless communication terminal to receive a corresponding frame. The second wireless communication terminal may receive a physical frame on the basis of the Partial AID field. In detail, when a Partial AID field value indicates the second wireless communication terminal, the second wireless communication terminal may receive the physical frame.

The SHORT GI field indicates whether data included in the physical frame has a relatively short guard interval (GI) value.

The TXOP_PS field indicates whether, during transmission of the physical frame by the first wireless communication terminal, a wireless communication terminal other than a wireless communication terminal receiving the corresponding frame may enter a power save mode.

The GI_NYSM field indicates an NSYM value when a short GI is used.

The Coding field indicates whether LDPC coding is applied to data.

The LDPC extra field indicates whether an additional OFDM symbol is included by applying LDPC coding to data.

The MCS field indicates a modulation and coding scheme (MCS) of a signal including data.

The Beamformed field indicates whether beam forming is applied.

The CRC field indicates whether the SIG-A field includes an error.

The Tail field indicates an end of the SIG-A field.

A physical frame for the MU may include at least one of a BW field, an STBC field, a Group ID field, a plurality of NSTS fields, a TXOP_PS field, a SHORT GI field, a GI_NYSM field, a Coding field, an LDPC extra field, a CRC field, and a Tail field.

The Group ID field indicates a group identifier for identifying a group including the second wireless communication terminal to receive a physical frame. In detail, the Group ID field may have one of 1 to 62, not 0 nor 63. At this point, a Group ID field value identifies a group including the maximum number of the plurality of second wireless communication terminals. At this point, the number of the plurality of second wireless communication terminals may be 4.

The plurality of NSTS fields indicate the number of spatial time streams to be transmitted to the plurality of second respective communication terminals belonging to a group indicated by a GID. In detail, an NSTS filed value is the number of wireless streams to be transmitted to the second wireless communication terminals.

For the MU physical frame, an MCS value of a signal including data is signaled by the SIG-B.

Other fields are the same as having been described in relation to the physical frame for the SU.

However, such an SIG-A field is not considered for MU transmission through the OFDMA. Accordingly, the SIG-A field is necessary which is capable of signaling MU transmission through the OFDMA. Descriptions thereabout will be provided in relation to FIGS. 22 to 24.

Figure 22:
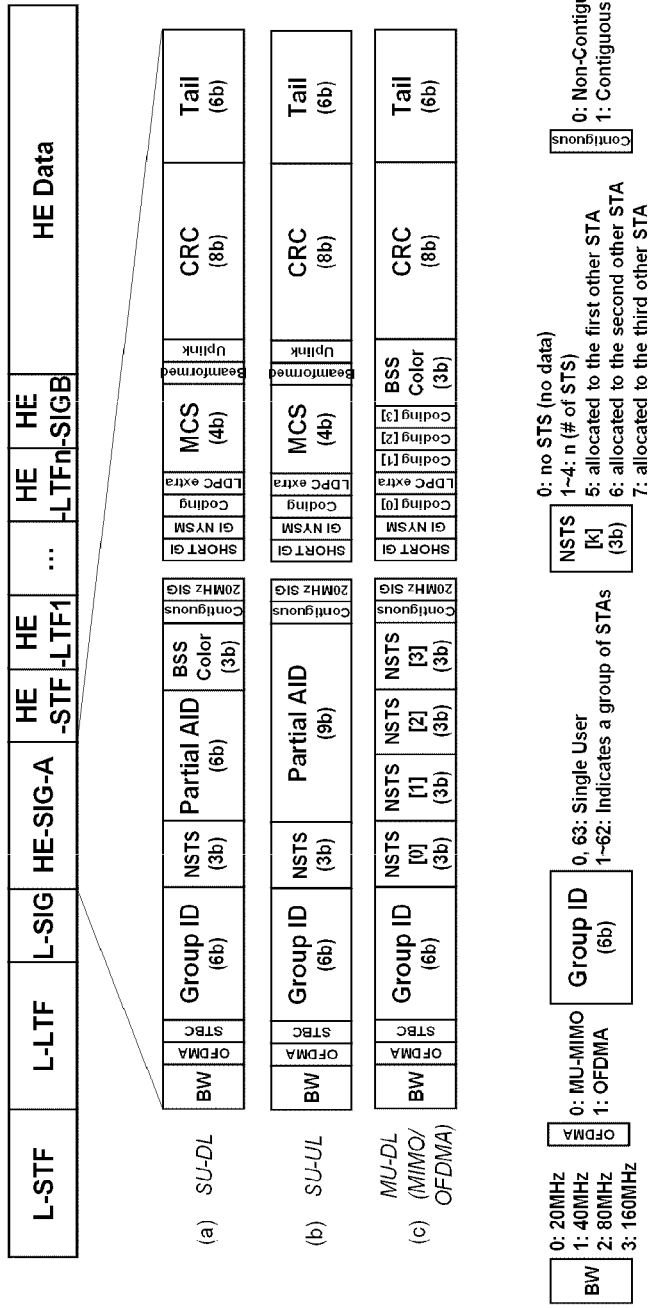
FIG. 22 illustrates a format of an SIG-A field according to another embodiment of the present invention.

FIG. 22 illustrates a format of an SIG-A field according to another embodiment of the present invention.

As described above, the format of the SIG-A field may be differed according to whether the physical frame is for the SU or for the MU. In addition, even if being the physical frame for the SU, the SIG-A field format may be differed according to whether the physical frame is for downlink or for uplink.

In detail, the SIG-A field may include a field for indicating whether the OFDMA is applied. At this point, the first wireless communication terminal may perform SU-MIMO transmission through a frequency band allocated to the second wireless communication terminal, while transmitting data through the OFDMA to the second wireless communication terminal in the frequency band allocated to the second wireless terminal.

In addition, a field may be included which indicates that at least any one of the SIG-A field and the SIG-B field is repeated at every minimum unit frequency bandwidth. At this point, the minimum unit frequency bandwidth may be 20 MHz.

In addition, the SIG-A field included in the physical frame for MU OFDMA transmission may include a field for indicating whether frequency bands respectively allocated to the plurality of second communication terminals are contiguous.

The detailed format of the SIG-A field will be described in relation to FIGS. 22(a) to 22(c).

FIG. 22(a) shows the SIG-A field included in the physical frame for downlink transmission to the SU.

The SIG-A field included in the physical frame for the SU may include at least any one of a BW field, an OFDMA field, an STBC field, a Group ID field, an NSTS field, a Partial AID field, a BSS Color field, a Contiguous field, a 20 MHz SIG field, a SHORT GI field, a GI_NYSM field, a Coding field, an LDPC extra field, an MCS field, a Beamformed field, an Uplink field, a CRC field, and a Tail field.

The OFDMA field indicates whether the physical frame is for MU transmission through the OFDMA. For the SIG-A field included in the physical frame for the SU, a value of the OFDMA field is 0.

The Contiguous field indicates whether frequency bands allocated to the second wireless communication terminals are contiguous.

The 20 MHz SIG field indicates whether at least one of the SIG-A field and SIG-B field is repeated for every minimum unit frequency bandwidth. For the physical frame for the SU, the SIG-B field may be omitted. Accordingly, the 20 MHz SIG field indicates whether the SIG-A field is repeated for every minimum unit frequency bandwidth.

The Uplink field indicates whether the physical frame is for uplink transmission. Since the case of FIG. 22(a) represents a downlink transmission frame for the SU, a value of the Uplink field is 0.

The BSS color field indicates a value for identifying a BSS. In a detailed embodiment, the second wireless communication terminal may perform a CCA on the basis of a BSS color field value. In detail, the second wireless communication terminal having received an SU downlink physical frame may determine whether a Partial AID field value matches an AID thereof. When the Partial AID field value matches the AID thereof, the second wireless communication terminal may receive the physical frame. When the Partial AID field value does not match the AID thereof, the second wireless communication terminal may determine that the BSS color field value is the same as a color value of a BSS to which the second wireless communication terminal belongs. For the physical frame to which the same color is written, the second wireless communication terminal determines whether a frequency band is idle on the basis of a first reference value at the time of performing a CCA. For the physical frame to which a different color is written, the second wireless communication terminal determines whether the frequency band is idle by applying a second reference value at the time of performing a CCA. At this point, the second reference value may be equal to or greater than the first reference value. Through this, the second wireless communication terminal preferentially prevents a collision with a physical frame having been transmitted from a BSS including the second wireless communication terminal than a collision with a physical frame having been transmitted from a BSS that does not include the second wireless communication terminal. When receiving the SU downlink physical frame, the first wireless communication terminal performs a CCA through the second reference value without comparing the BSS color values.

Descriptions about other fields may be the same as the descriptions in relation to FIG. 21.

FIG. 22(b) shows the SIG-A field included in the physical frame for uplink transmission to the SU.

A format of the SIG-A field included in the physical frame for uplink transmission for the SU may be the same as that of the SIG-A field having been described in relation to FIG. 22(a) except for not including the BSS color field and the difference in the number of bits of the Partial AID field.

Since the physical frame for uplink transmission for the SU is a physical frame for uplink transmission, a value of the Uplink field is 1.

A wireless communication terminal receiving the physical frame for uplink transmission for the SU operates as the following in relation to a CCA. In detail, when receiving the physical frame for uplink transmission for the SU, the second wireless communication terminal may determine whether the Partial AID field matches an AID of the first wireless communication terminal of a BSS to which the first wireless communication terminal belongs. When the Partial AID field matches the AID of the first wireless communication terminal of the BSS to which the first wireless communication terminal belongs, the second wireless communication terminal may determine whether a frequency band is idle on the basis of the first reference value at the time of performing a CCA. When the Partial AID field does not match the AID of the first wireless communication terminal of the BSS to which the first wireless communication terminal belongs, the second wireless communication terminal may determine whether a frequency band is idle on the basis of the second reference value at the time of performing the CCA. At this point, the second reference value may be equal to or greater than the first reference value as described above. When the first wireless communication terminal receives the SU uplink physical frame and a value of the partial AID field matches the AID of the first wireless communication terminal, frame reception is continued. When the Partial AID field does not match the AID of the first wireless communication terminal, the first wireless communication terminal may determine whether the frequency band is idle on the basis of the second reference value at the time of performing the CCA.

FIG. 22(c) shows the SIG-A field included in the physical frame for downlink transmission for the MU.

The SIG-A field of the physical frame for downlink transmission for the MU may include a plurality of NSTS fields. At this point, each of the plurality of NSTS fields indicates the number of spatial time streams to be transmitted to the second wireless communication terminal included in a group indicated by the GID field. The first wireless communication terminal may use maximum 4 spatial time streams to any one second wireless communication terminal in consideration of communication complexity. In particular, when the first wireless communication terminal transmits data to the plurality of second wireless communication terminals through OFDMA transmission, the first wireless communication terminal may perform MIMO transmission using maximum 4 spatial time streams on each of the plurality of second wireless communication terminals. When the NSTS field is a 3-bit field, cases where an NSTS field value is 5, 6 and 7 are not used.

When the first wireless communication terminal performs MU data transmission through the OFDMA, the first wireless communication terminal may signal an allocated bandwidth to the second wireless communication terminal through a value that is not used in the NSTS field.

When the OFDMA field value is 1 and the NSTS field value is one of 5, 6 and 7, the NSTS field may indicate that the number of spatial time streams to be transmitted to the second wireless communication terminal corresponding thereto is 0. In addition, according to the NSTS field value, it may be indicated that an additional frequency band may be allocated to another second wireless communication terminal besides a second wireless communication terminal corresponding to the NSTS field. In an embodiment, when the maximum number of the plurality of second wireless communication terminals is n and a value of NSTS[k] is any one of 5, 6 and 7, the NSTS[k] field indicates that the entire frequency bandwidth is equally divided by n to be uniformly allocated to the plurality of second wireless communication terminals. In this case, the NSTS[k] field indicates that a bandwidth obtained by dividing the entire frequency bandwidth equally by n is additionally allocated to another second wireless communication terminal besides a (k+1)-th second wireless communication terminal. For example, when n is 4 and the NSTS[k] value is 5, the NSTS[k] field may indicate that a quarter of the entire frequency band is further allocated to a 1st second wireless communication terminal. In addition, when n is 4 and the NSTS[k] value is 6, the NSTS[k] field may indicate that a quarter of the entire frequency band is further allocated to a 2nd second wireless communication terminal. In addition, when n is 4 and the NSTS[k] value is 7, the NSTS[k] field may indicate that a quarter of the entire frequency band is further allocated to a 3rd second wireless communication terminal.

At this point, when indicating that the frequency bands are contiguous, the Contiguous field may indicate that contiguous frequency bands are allocated to the remaining second wireless communication terminals except a (K+1)-th second wireless communication terminal. For convenience of explanation, it is assumed that the plurality of second wireless communication terminals included in a group indicated by the Group ID field are a first station STA1, a second station STA2, a third station STA3, and a fourth station STA4. At this point, when NSTS[k]={2, 2, 5, 1}, the NSTS field indicates that the first station STA1 is allocated two spatial time streams in a sub-frequency band. In addition, the NSTS field indicates that the second station STA2 is allocated two spatial time streams in the sub-frequency band. In addition, the NSTS field indicates that a frequency band is not allocated to the third station STA3. In addition, the NSTS field indicates that the fourth station STA4 is allocated one spatial time stream in the sub-frequency band. At this point, when the Contiguous field is 0, the NSTS field indicates that first and third sub-frequency bands are allocated to the first station STA1. Furthermore, the NSTS field indicates that a second sub-frequency band is allocated to the second station STA2. Furthermore, the NSTS field indicates that a fourth sub-frequency band is allocated to the fourth station STA4. In another detailed embodiment, when the Contiguous field is 1, the NSTS field indicates that first and second sub-frequency bands are allocated to the first station STA1. In addition, the NSTS field indicates that a third sub-frequency band is allocated to the second station STA2. In addition, the NSTS field indicates that a fourth sub-frequency band is allocated to the fourth station STA4.

For the physical frame for downlink transmission for the MU, information about MSC of a signal including data for each of the plurality of second wireless communication terminals is included in the SIG-B field.

Due to the physical frame for downlink transmission for the MU, the Uplink field value is 0.

Descriptions about other fields may be the same as those of the SIG-A field having been described in relation to FIG. 22(a).

An operation of the second wireless communication terminal receiving the MU downlink physical frame may be the same as the following.

The second wireless communication terminal to receive the MU downlink physical frame may determine whether a Partial AID field value matches an AID thereof. When the Partial AID field value matches the AID of the second wireless communication terminal, the second wireless communication terminal may receive the physical frame. When the Partial AID field value does not match the AID of the second wireless communication terminal, the second wireless communication terminal may determine whether a BSS color field value is identical to a color value of a BSS to which the second wireless communication terminal belongs. For the physical frame to which the same color is written, the second wireless communication terminal determines whether a frequency band is idle on the basis of a first reference value at the time of performing a CCA. For the physical frame to which a different color is written, the second wireless communication terminal determines whether a frequency band is idle by applying a second reference value at the time of performing a CCA. At this point, the second reference value may be equal to or greater than the first reference value. Through this, the second wireless communication terminal preferentially prevents a collision with a physical frame having been transmitted from a BSS including the second wireless communication terminal than a collision with a physical frame having been transmitted from a BSS that does not include the second wireless communication terminal. When receiving the MU downlink physical frame, the first wireless communication terminal performs a CCA through the second reference value without comparing the BSS color values.

An operation of the second wireless communication terminal will be described, when the OFDMA field value is 1, the 20 MHz SIG field value is 0, and the maximum number of the second wireless communication terminals is 4.

When all of a plurality of NSTS fields have values of 1 to 4, each of 4 second wireless communication terminals indicated by the Group ID field is allocated a sub-frequency bandwidth obtained by uniformly dividing the entire frequency bandwidth by 4. Each of the 4 second wireless communication terminals indicated by the Group ID field sequentially receives time-space wireless streams as many as the number indicated by the NSTS field in each sub-frequency band.

When any one of a plurality of NSTS fields has a value of 0, 5, 6, or 7, any one second wireless communication terminal stops reception of the physical frame, the any one second wireless communication terminal corresponding to the NSTS field having the value of 5, 6, or 7 from among the 4 second wireless communication terminals indicated by the Group ID field. The entire frequency band is divided into sub-frequency bands having a uniform bandwidth and the other three second wireless communication terminals receive spatial time streams to be transmitted through sub-frequency bands respectively allocated thereto. At this point, when the NSTS field value is 0, the corresponding sub-frequency band is not used. In addition, when the NSTS field value is 5, 6, or 7, a sub-frequency band is additionally allocated to any one of the three second wireless communication terminals. At this point, when the Contiguous field is 0, the NSTS field indicates that non-contiguous sub-frequency bands are allocated to the any one second wireless communication terminal with a sequence of the NSTS fields maintained. Accordingly, the any one second wireless communication terminal receives the spatial time stream indicated by the NSTS field through the non-contiguous sub-frequency bands. When the Contiguous field is 1, the NSTS field indicates that contiguous sub-frequency bands are allocated to the any one second wireless communication terminal. Accordingly, the any one second wireless communication terminal receives a spatial time stream indicated by the NSTS field through the contiguous sub-frequency bands.

When each of arbitrary two fields of NSTS[k1] and NSTS[k2] among the plurality of NSTS fields has a value of 0, 5, 6, or 7, (k1+1)-th and (k2+1)-th second wireless communication terminals from among the 4 second wireless communication terminals indicated by the Group ID field stop receiving the physical frame. The entire frequency band is divided into sub-frequency bands having a uniform bandwidth and two second wireless communication terminals other than the (k+1)-th and (k2+1)-th second wireless communication terminals receive space-time streams to be transmitted through the sub-frequency bands respectively allocated thereto. At this point, when the NSTS field value is 0, the corresponding sub-frequency band is not used. When the NSTS field value is 5 or 6, a sub-frequency band is additionally allocated to at least one of the two second wireless communication terminals other than the (k+1)-th and (k2+1)-th second wireless communication terminals. When the Contiguous field is 1, the NSTS field indicates that contiguous sub-frequency bands are allocated to the two second wireless communication terminals. Accordingly, the two second wireless communication terminals receive spatial time streams indicated by the NSTS field through the contiguous sub-frequency bands. When the Contiguous field is 0, the NSTS field indicates that non-contiguous sub-frequency bands are allocated to at least any one second wireless communication terminal. Accordingly, any one of the two second wireless communication terminals receives a spatial time stream indicated by the NSTS field through the non-contiguous sub-frequency bands.

When each of arbitrary three fields of NSTS[k1], NSTS[k2] and NSTS[k3] among the plurality of NSTS fields has a value of 0, 5, 6, or 7, (k1+1)-th, (k2+1)-th, and (k3+1)-th second wireless communication terminals from among the 4 second wireless communication terminals indicated by the Group ID field stop receiving the physical frame. The entire frequency band is divided into sub-frequency bands having a uniform bandwidth and any one second wireless communication terminal other than the (k+1)-th, (k2+1)-th and (k3+1)-th second wireless communication terminals receives a space-time stream to be transmitted through the sub-frequency band allocated one second wireless communication terminal. At this point, when the NSTS field value is 0, the corresponding sub-frequency band is not used. When the NSTS field value is 5, a sub-frequency band is additionally allocated to the any one second wireless communication terminal. At this point, when the Contiguous field is 0, non-contiguous sub-frequency bands are allocated to the any one second wireless communication terminal with a sequence of the NSTS fields maintained. Accordingly, the any one second wireless communication terminal receives a spatial time stream indicated by the NSTS field through the non-contiguous sub-frequency bands. When the Contiguous field is 1, the NSTS field indicates that contiguous sub-frequency bands are allocated to the any one second wireless communication terminal. Accordingly, the any one second wireless communication terminal receives a spatial time stream indicated by the NSTS field through the contiguous sub-frequency bands. When the Contiguous field is 0, the NSTS field indicates that non-contiguous sub-frequency bands are allocated to the any one second wireless communication terminal. Accordingly, the any one second wireless communication terminal receives a spatial time stream indicated by the NSTS field through the non-contiguous sub-frequency bands.

When the 20 MHz SIG field is 1, as described above, it is indicated that the bandwidth of the entire frequency band is equal to or greater than the minimum unit frequency bandwidth, and the first wireless communication terminal transmits data in an OFDMA manner to different second wireless communication terminals for each frequency band having the minimum unit frequency bandwidth. At this point, the first wireless communication terminal transmits a separate SIG-A field for each frequency band having the minimum unit frequency bandwidth.

Accordingly, the second wireless communication terminal checks the SIG-A field for each frequency band having the minimum unit frequency bandwidth to perform a data reception operation in a frequency band allocated to the second wireless communication terminal.

For the SIG-A field of the physical frame for the MU having described in relation to FIG. 22, there exists a field for each piece of information. Accordingly, the second wireless communication terminal is required to search for all fields in order to find out information thereabout. When the SIG-A field includes the independent sub-field for each group including a plurality of wireless communication terminals, the second wireless communication terminal only searches for the sub-field corresponding to a group including itself. A description thereabout will be provided in relation to FIG. 23.

Figure 23:
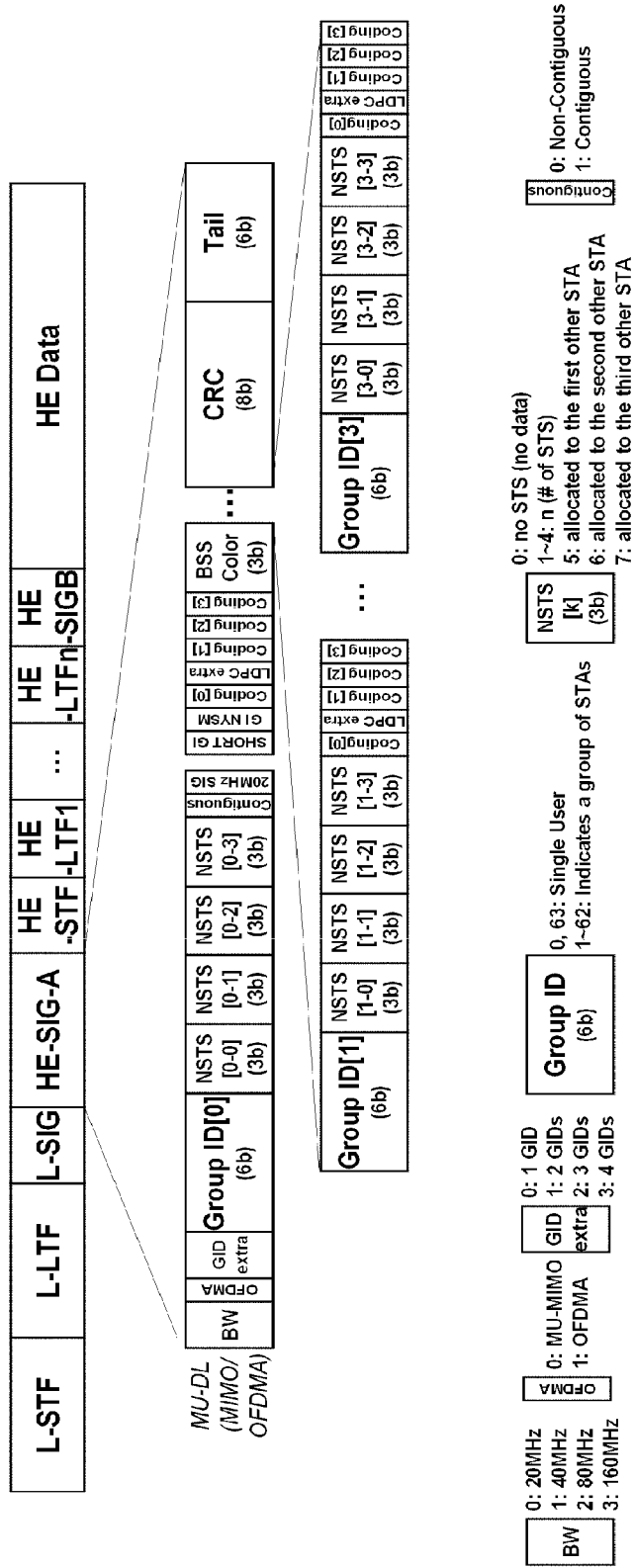
FIG. 23 illustrates a format of an SIG-A field including an independent subfield for each group including a plurality of wireless communication terminals according to another embodiment of the present invention.

FIG. 23 illustrates a format of an SIG-A field including an independent subfield for each group including a plurality of wireless communication terminals according to another embodiment of the present invention.

In order to include the independent sub-field for each group including the plurality of wireless communication terminals, the SIG-A field may include a field indicating the number of groups signaled by the SIG-A field.

In addition, the SIG-A field may include an independent sub-field for each second wireless communication terminal. At this point, the independent sub-field includes information about the second wireless communication terminal. In detail, the information about the second wireless communication terminal may include at least any one of the above-described Group ID field, NSTS field, Contiguous field, 20 MHz SIG field, SHORT GI field, GI NYSM field, Coding field, and LDPC extra field.

In an embodiment of FIG. 23, the SIG-A field includes the GID Extra field. The GID Extra field indicates the number of groups of the second wireless communication terminals to be signaled by the SIG-A field. In detail, the GID Extra field indicates the number of groups of second wireless communication terminals included in a frequency band indicated by the BW field.

In addition, as described above, the SIG-A field includes a sub-field including information about a group for each group of the second wireless communication terminals. In detail, the independent sub-field for each group included in the SIG-A field includes a Group ID field, an NSTS field, a Contiguous field, a 20 MHz SIG field, a SHORT GI field, a GI NYSM field, a Coding field, and an LDPC extra field.

In addition, the SIG-A field according to a value of the GID_extra field becomes differed. Accordingly, the SIG-A field may have a variable length. In a detailed embodiment, a value of the GID_extra field may be maximum 3. When the GID_extra field value is 0, the GID_extra field indicates that the SIG-A field signals only one group. When the GID_extra field value is 1, 2, or 3, the GID_extra field indicates that the SIG-A field signals two, three, or four groups. For example, the BW field indicates a 20 MHz frequency band and the GID_extra field value is 3, the SIG-A field signals 4 groups. When the 4 groups respectively include 4 second wireless communication terminals, the SIG-A field may signal that 16 second wireless communication terminals are respectively allocated 1.25 MHz sub-frequency bands.

Other descriptions about the SIG-A field may be the same as those of the SIG-A field having been described in relation to FIG. 23.

Figure 24:
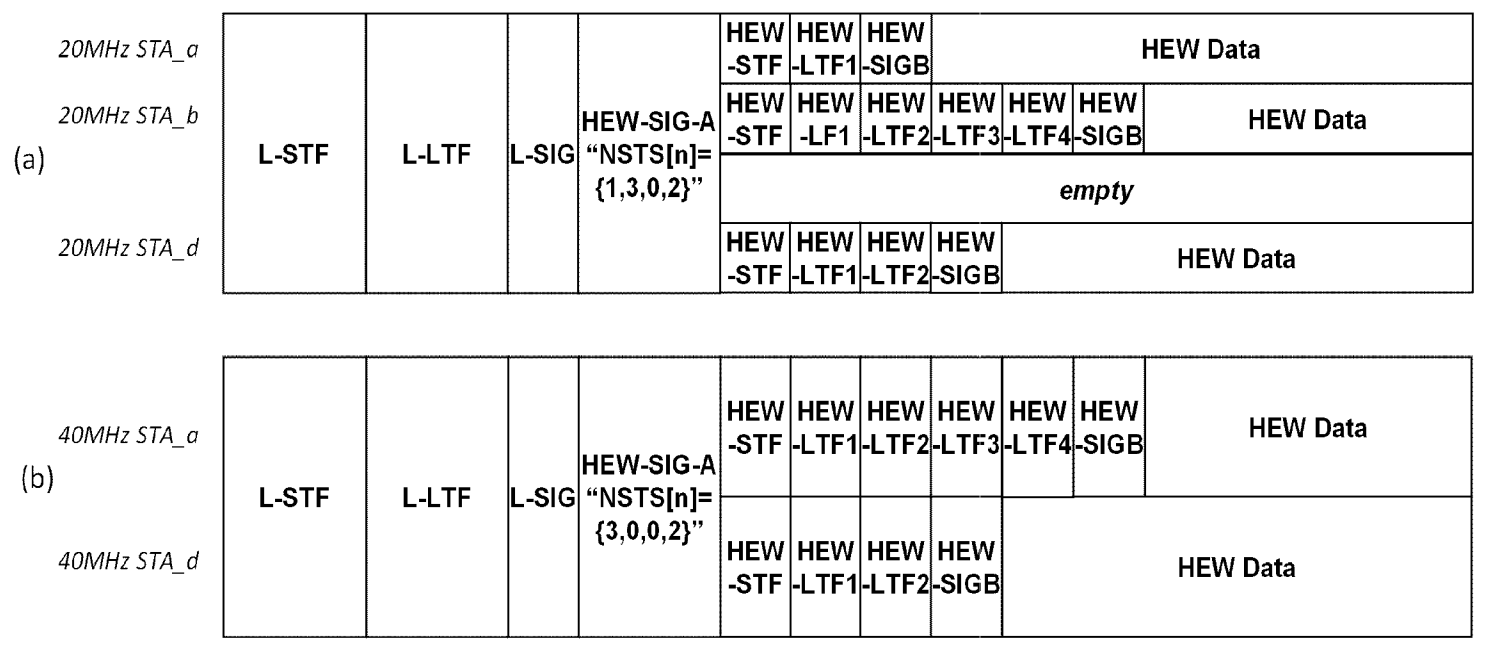

FIG. 24 illustrates a configuration of a physical frame including an SIG-A field according to an embodiment of the present invention.

FIG. 24(a) shows a case where the OFDMA field has a value of 1 and values of 4 NSTS fields are NSTS[n]={1, 3, 0, 2} in a SIG-A. At this point, second wireless communication terminals belonging to a corresponding group are a first station STA_a, a second station STA_b, a third station STA_c, and a fourth station STA_d. At this point, the BW field indicates an 80 MHz frequency band. The entire 80 MHz frequency band is divided into 20 MHz sub-frequency bands obtained by dividing the entire frequency band by 4. According to the NSTS field value, the first wireless communication terminal does not transmit data in a third sub-frequency band corresponding to the third station STA_c. The first wireless communication terminal respectively transmits 1, 3, and 2 spatial time streams through first, second, and fourth sub-frequency bands. In addition, the first wireless communication terminal respectively transmits 1, 4, and 2 HE-LTF signals through the first, second, and fourth sub-frequency bands. Accordingly, the first station STA_a receives one spatial time stream through the first sub-frequency band. In addition, the second station STA_b receives three spatial time streams through the second sub-frequency band. Furthermore, the fourth station STA_d receives two spatial time streams through the fourth sub-frequency band.

FIG. 24(b) shows a case where the OFDMA field has a value of 1 and values of 4 NSTS fields are NSTS[n]={3, 0, 0, 2} in a SIG-A. At this point, second wireless communication terminals belonging to a corresponding group are a first station STA_a, a second station STA_b, a third station STA_c, and a fourth station STA_d. At this point, the BW field indicates an 80 MHz frequency band. The entire 80 MHz frequency band is divided into 20 MHz sub-frequency bands obtained by dividing the entire frequency band by 4. According to the NSTS field value, the first wireless communication terminal does not transmit data in second and third sub-frequency bands corresponding to the second station STA_b and the third station STA_c. The first wireless communication terminal respectively transmits 3 and 2 spatial time streams through the first and fourth sub-frequency bands. In addition, the first wireless communication terminal respectively transmits 4 and 2 spatial time streams through the first and fourth sub-frequency bands. Accordingly, the first station STA_a receives 3 spatial time streams through the first sub-frequency band. Furthermore, the fourth station STA_d receives 2 spatial time streams through the fourth sub-frequency band.

Figure 25:
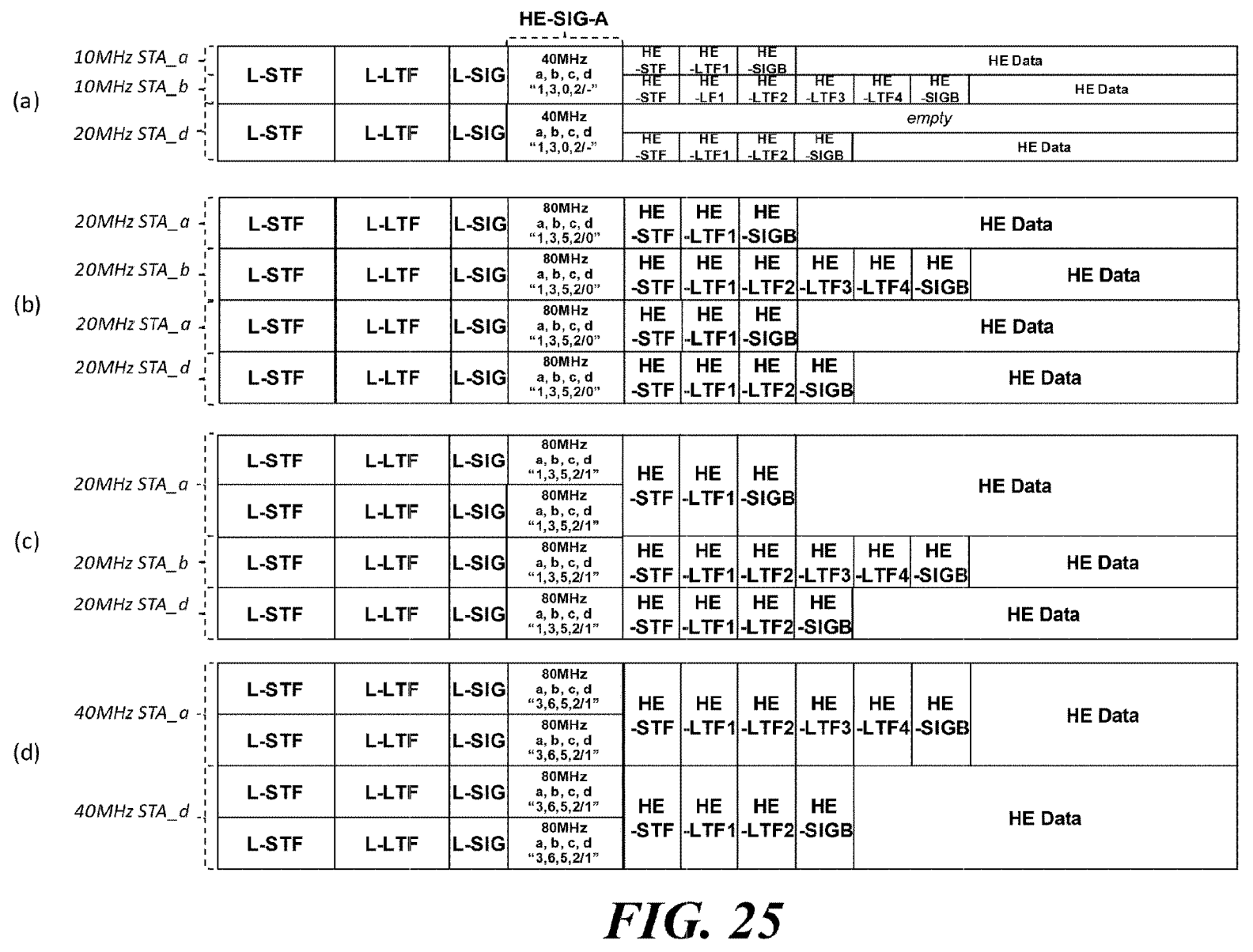

FIG. 25 illustrates a configuration of a physical frame including the SIG-A field according to another embodiment of the present invention.

FIG. 25(a) shows a case where the OFDMA field has a value of 1 and values of 4 NSTS fields are NSTS[n]={1, 3, 0, 2} in an SIG-A. At this point, second wireless communication terminals belonging to a corresponding group are a first station STA_a, a second station STA_b, a third station STA_c, and a fourth station STA_d. At this point, the BW field indicates a 40 MHz frequency band. The entire 40 MHz frequency band is divided into 10 MHz sub-frequency bands obtained by dividing the entire frequency band by 4. According to the NSTS field value, the first wireless communication terminal does not transmit data in a third sub-frequency band corresponding to the third station STA_c. The first wireless communication terminal respectively transmits 1, 3 and 2 spatial time streams through first, second, and fourth sub-frequency bands. In addition, the first wireless communication terminal respectively transmits 1, 4 and 2 HE-LTF signals through the first, second, and fourth sub-frequency bands. Accordingly, the first station STA_a receives 1 spatial time stream through the first sub-frequency band. In addition, the second station STA_b receives 3 spatial time streams through the second sub-frequency band. Furthermore, the fourth station STA_d receives 2 spatial time streams through the fourth sub-frequency band.

FIG. 25(b) shows a case where the OFDMA field has a value of 1 and values of 4 NSTS fields are NSTS[n]={1, 3, 5, 2} in an SIG-A. At this point, second wireless communication terminals belonging to a corresponding group are a first station STA_a, a second station STA_b, a third station STA_c, and a fourth station STA_d. At this point, the BW field indicates an 80 MHz frequency band. The entire 80 MHz frequency band is divided into 20 MHz sub-frequency bands obtained by dividing the entire frequency band by 4. Since a Contiguous field value is 0 and an NSTS[2] field value is 5, the first wireless communication terminal does not transmit data to the third station STA_c. Instead, the first wireless communication terminal transmits data for the first station STA_a in the third sub-frequency band. The first wireless communication terminal transmits 1 spatial time streamspatial time stream through the first and third sub-frequency bands. In addition, the first wireless communication terminal transmits 3 spatial time streamspatial time streams through the second sub-frequency band. In addition, the first wireless communication terminal transmits 2 spatial time streamspatial time streams through the fourth sub-frequency band. In addition, the first wireless communication terminal respectively transmits 1, 4, 1 and 2 HE-LTF signals through the first, second, third and fourth sub-frequency bands. Accordingly, the first station STA_a receives 1 spatial time streamspatial time stream through the first and third sub-frequency bands. In addition, the second station STA_b receives 3 spatial time streamspatial time streams through the second sub-frequency band. Furthermore, the fourth station STA_d receives 2 spatial time streamspatial time streams through the fourth sub-frequency band.

FIG. 25(c) shows a case where the OFDMA field has a value of 1 and values of 4 NSTS fields are NSTS[n]={1, 3, 5, 2} in an SIG-A. At this point, second wireless communication terminals belonging to a corresponding group are a first station STA_a, a second station STA_b, a third station STA_c, and a fourth station STA_d. At this point, the BW field indicates an 80 MHz frequency band. The entire 80 MHz frequency band is divided into 20 MHz sub-frequency bands obtained by dividing the entire frequency band by 4.

Since a Contiguous field value is 1 and an NSTS[2] field value is 5, the first wireless communication terminal does not transmit data to the third station STA_c. Instead, the first wireless communication terminal transmits data for the first station STA_a in the second sub-frequency band. The first wireless communication terminal transmits 1 spatial time streamspatial time stream through the first and second sub-frequency bands. In addition, the first wireless communication terminal transmits 3 spatial time streams through the third sub-frequency band. In addition, the first wireless communication terminal transmits 2 spatial time streams through the fourth sub-frequency band. In addition, the first wireless communication terminal respectively transmits 1, 1, 4 and 2 HE-LTF signals through the first, second, third and fourth sub-frequency bands. Accordingly, the first station STA_a receives 1 spatial time stream through the first and second sub-frequency bands. In addition, the second station STA_b receives 3 spatial time streams through the third sub-frequency band. Furthermore, the fourth station STA_d receives 2 spatial time streams through the fourth sub-frequency band.

FIG. 25(d) shows a case where the OFDMA field has a value of 1 and values of 4 NSTS fields are NSTS[n]={3, 6, 5, 2} in an SIG-A. At this point, second wireless communication terminals belonging to a corresponding group are a first station STA_a, a second station STA_b, a third station STA_c, and a fourth station STA_d. At this point, the BW field indicates an 80 MHz frequency band. The entire 80 MHz frequency band is divided into 20 MHz sub-frequency bands obtained by dividing the entire frequency band by 4. Since a Contiguous field value is 1, an NSTS[1] field value is 6, and an NSTS[2] field value is 5, the first wireless communication terminal does not transmit data to the second station STA_b and the third station STA_c. Accordingly, the first wireless communication terminal transmits 3 spatial time streams through the first and second sub-frequency bands. In addition, the first wireless communication terminal transmits 2 spatial time streams through the third and fourth sub-frequency bands. In addition, the first wireless communication terminal respectively transmits 4, 4, 2 and 2 HE-LTF signals through the first, second, third and fourth sub-frequency bands. Accordingly, the first station STA_a receives 3 spatial time streams through the first and second sub-frequency bands. Furthermore, the fourth station STA_d receives 2 spatial time streams through the fourth sub-frequency band.

Figure 26:
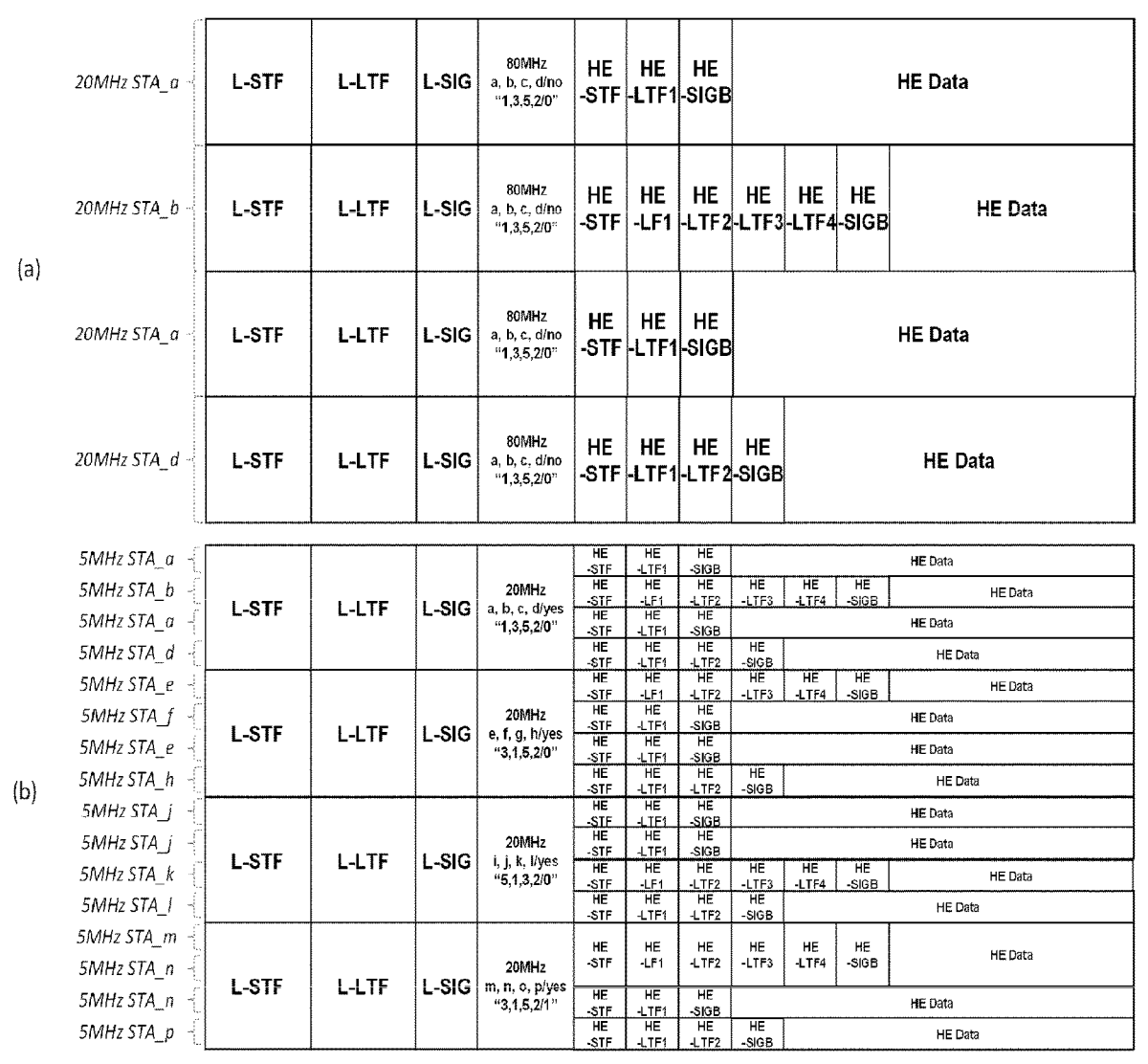

FIG. 26 illustrates a configuration of a physical frame including an SIG-A field according to another embodiment of the present invention.

FIG. 26(a) shows a case where the OFDMA field has a value of 1 and values of 4 NSTS fields are NSTS[n]={1, 3, 5, 2} in an SIG-A. At this point, second wireless communication terminals belonging to a corresponding group are a first station STA_a, a second station STA_b, a third station STA_c, and a fourth station STA_d. At this point, the BW field indicates an 80 MHz frequency band. The entire 80 MHz frequency band is divided into 20 MHz sub-frequency bands obtained by dividing the entire frequency band by 4. Since a Contiguous field value is 0 and an NSTS[2] field value is 5, the first wireless communication terminal does not transmit data to the third station STA_c. Instead, the first wireless communication terminal transmits data for the first station STA_a in the third sub-frequency band. The first wireless communication terminal transmits 1 spatial time stream through the first and third sub-frequency bands. In addition, the first wireless communication terminal transmits 3 spatial time streams through the second sub-frequency band. In addition, the first wireless communication terminal transmits 2 spatial time streams through the fourth sub-frequency band. In addition, the first wireless communication terminal respectively transmits 1, 4, 1 and 2 HE-LTF signals through the first, second, third and fourth sub-frequency bands. Accordingly, the first station STA_a receives 1 spatial time stream through the first and third sub-frequency bands. In addition, the second station STA_b receives 3 spatial time streams through the second sub-frequency band. Furthermore, the fourth station STA_d receives 2 spatial time streams through the fourth sub-frequency band.

In addition, since a 20 MHz SIG field value is 1, the first wireless communication terminal repetitively transmits the SIG field at every minimum unit frequency bandwidth. As described above, the minimum unit frequency bandwidth may be 20 MHz. In addition, the SIG field may include the SIG-A field and the SIG-B field. Accordingly, the first station STA_a, the second station STA_b, and the fourth station STA_d may obtain the SIG-field through any one sub-frequency band in the entire frequency band.

An embodiment of FIG. 26(b) is the same as the above-described embodiments except that the 20 MHz SIG field value is 1. Accordingly, the first wireless communication terminal transmits a different SIG field at every minimum unit frequency bandwidth. Accordingly, the second wireless communication terminal searches for a sub-frequency band in which transmission is performed by the second wireless communication terminal to obtain the SIG field.

Figure 27:
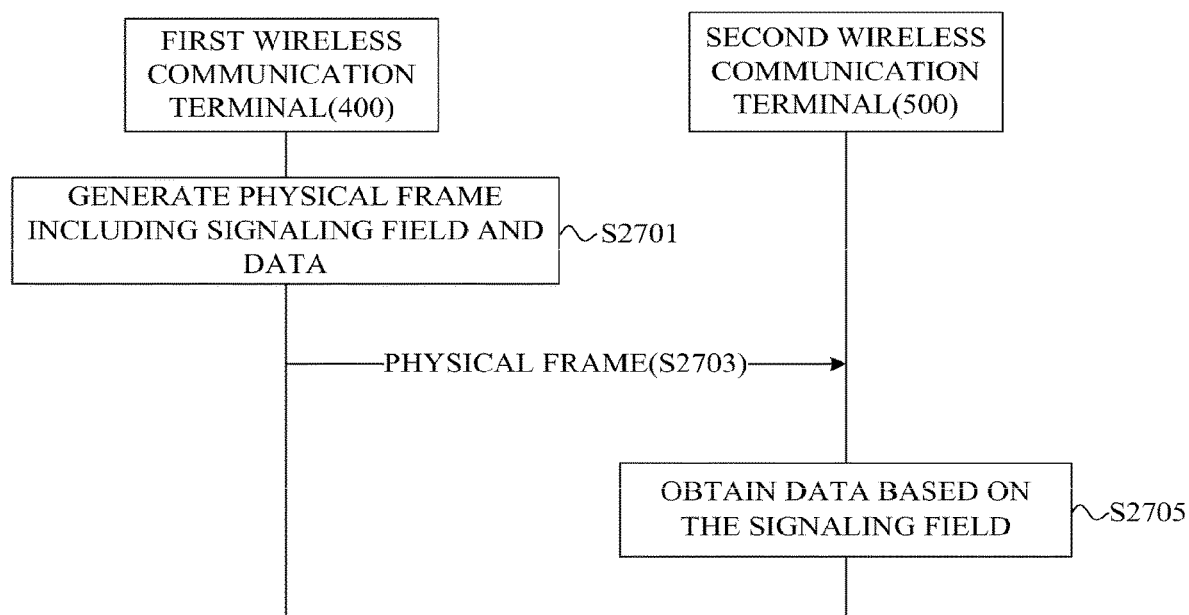
FIG. 27 is a ladder diagram showing operations of a first wireless communication terminal and a second wireless communication terminal according to an embodiment of the present invention.

FIG. 27 is a ladder diagram showing operations of a first wireless communication terminal and a second wireless communication terminal according to an embodiment of the present invention.

A first wireless communication terminal 400 generates a physical frame including a signaling field and data (step S2701). At this point, data is transmitted by the first wireless communication terminal 400 to each of a plurality of second wireless communication terminals 500.

The plurality of second wireless communication terminals 500 may be divided into a plurality of groups. At this point, the signaling field may include an independent sub-field for each of the plurality of groups. In addition, the signaling field may include a field indicating the number of the plurality of groups. The signaling field may have a variable length. In addition, the maximum number of the plurality of second wireless communication terminals 500 that may be included in the group may be 4. This is because the number of groups included in the signaling field may be varied. In addition, the signaling field may include a plurality of fields indicating identifiers for identifying the plurality of respective groups.

In addition, the signaling field may include information about a sub-frequency band allocated to each of the plurality of second wireless communication terminals 500. The information about the sub-frequency band may include any one of information indicating a space-time stream number, information indicating whether convolution coding is applied to data for each of the plurality of second wireless communication terminals 500, and information indicating whether an additional OFDM symbol is required by applying Low-density parity-check code (LDPC) coding to data for each of the plurality of second wireless communication terminals 500.

In detail, bandwidths of sub-frequency bands allocated to the plurality of respective second wireless communication terminals may be uniform.

In another detailed embodiment, the bandwidths of the sub-frequency bands allocated to the plurality of respective second wireless communication terminals may not be uniform. In detail, the first wireless communication terminal 400 may allocate contiguous frequency bands having non-uniform bandwidths to the plurality of respective second wireless communication terminals.

In detail, the first wireless communication terminal 400 may allocate frequency bands to the plurality of respective second wireless communication terminals 500 through the following process. First, the first wireless communication terminal 400 obtains a basic allocation value by dividing a bandwidth of a frequency band 500 usable by the first wireless communication terminal 400 by the maximum number of the plurality of second wireless communication terminals 500. Thereafter, the first wireless communication terminal 400 obtains a remainder value by excluding a multiplication of the number of the plurality of second wireless communication terminals 500 and the basic allocation value from the bandwidth of the frequency band usable by the first wireless communication terminal 400. The first wireless communication terminal 400 allocates the obtained remainder value to the plurality of second wireless communication terminals 500. At this point, the first wireless communication terminal may allocate the obtained remainder value on the basis of the size of data to be transmitted to each of the plurality of second wireless communication terminals 500. In detail, the first wireless communication terminal 400 may allocate a frequency band corresponding to the obtained remainder value in proportion to the size of data to be transmitted to each of the plurality of second wireless communication terminals 500. In another detailed embodiment, the first wireless communication terminal 400 may allocate the entire frequency band corresponding to the obtained remainder value to a second wireless communication terminal 500 to receive the largest data among the plurality of second wireless communication terminals 500. This may be expressed as the following equation.

$$BWassign = BW/Nmax + BWadd$$

$$BWadd = f(BW - BW/Nmax \times n)$$

BWassign denotes a bandwidth of a frequency band to be allocated to an arbitrary second wireless communication terminal 500. BW denotes a bandwidth of a frequency band usable by the first wireless communication terminal 400. Nmax denotes a maximum value of the second wireless communication terminal 500. BWadd denotes a bandwidth of a frequency band additionally allocated to the arbitrary second wireless communication terminal 500. At this point, f(a) denotes a function for allocating a remaining frequency band and n denotes the number of the plurality of second wireless communication terminals 500. As the above description, the function for allocating the remaining frequency band may allocate the remaining frequency band to each of the plurality of the second wireless communication terminals on the basis of the size of data to be transmitted to each of the plurality of second wireless communication terminals 500.

The frequency band allocated to the plurality of second wireless communication terminals 500 may include a primary channel of a frequency band usable by the first wireless communication terminal 400. Through this, as described above, the first wireless communication terminal 400 may raise an efficiency of a CCA operation of the second wireless communication terminals.

In addition, the signaling field may include a field indicating whether to use Orthogonal Frequency-Division Multiple Access (OFDMA) transmission.

In addition, the signaling field may include a field indicating whether sub-frequency bands allocated to the plurality of respective second wireless communication terminals 500 are contiguous.

In a detailed embodiment, the signaling field may include any one of the above-described SIG-A field and SIG-B field.

The first wireless communication terminal 400 transmits the generated physical frame (step S2703). The first wireless communication terminal 500 may use a frequency band having a bandwidth equal to or greater than the minimum unit frequency bandwidth and transmit the signaling field in a unit of the minimum unit frequency bandwidth. At this point, the minimum unit frequency bandwidth indicates a minimum bandwidth of a frequency band usable by a base terminal. In detail, the first wireless communication terminal 500 may transmit the signaling field including different pieces of information in a unit of the minimum unit frequency bandwidth. Through this, a frequency band use efficiency in signaling field transmission may be raised. In another detailed embodiment, the first wireless communication terminal 500 may simultaneously transmit an identical signaling field in a unit of the minimum unit frequency bandwidth.

The second wireless communication terminal 500 obtains data having been transmitted thereto on the basis of the signaling field (step S2705). In detail, the second wireless communication terminal 500 may obtain the signaling field from the physical frame. The second wireless communication terminal 500 may obtain, from the signaling field, information about a sub-frequency band having been allocated thereto. The second wireless communication terminal 500 may obtain data included in the physical frame on the basis of the information about the sub-frequency band.

As described above, the signaling field may include the independent sub-field for each of the plurality of groups. At this point, the second wireless communication terminal 500 may decode the sub-field including information thereabout and stop decoding for the remaining sub-fields. In detail, the sub-field may include information about the sub-frequency band allocated to the second wireless communication terminal. The information about the sub-frequency band may include any one of information about the sub-frequency bandwidth, information indicating a space-time stream number, information indicating whether convolution coding is applied to data for the second wireless communication terminal 500, and information indicating whether an additional OFDM symbol is required by applying Low-density parity-check code (LDPC) coding to data for the second wireless communication terminal 500. Through this, a signaling field decoding efficiency of the second wireless communication terminal 500 may be raised.

As described above, although wireless LAN communication is exemplarily described for the present invention, the present invention is not limited thereto and may be identically applied to another communication system such as cellular communication. In addition, although the method, device and system of the present invention are described in relation to specific embodiments, the configuration elements, a part of or the entirety of operations of the present invention may be implemented using a computer system having general purpose hardware architecture.

In the foregoing, features, structures, or effects described in connection with embodiments are included in at least one embodiment, and are not necessarily limited to one embodiment.

Furthermore, the exemplified features, structures, or effects in various embodiments can be combined and modified by those skilled in the art. Accordingly, contents in connection with these combination and modification should be construed to fall in the scope of the present invention.

Although embodiments have been described with reference to a number of illustrative embodiments thereof, it should be understood that numerous other modifications and embodiments can be devised by those skilled in the art that will fall within the spirit and scope of the principles of the present invention. For example, variations and modifications in the component parts and/or arrangements, alternative uses will also be apparent to those skilled in the art. In addition, differences related to such modifications and application should be interpreted to be within the scope of the present invention defined in the appended claims.

The invention claimed is:

1. A wireless communication terminal comprising:
a transceiver; and
a processor,
wherein the processor is configured to:
receive, by using the transceiver, a physical frame for a transmission of data to each of a plurality of wireless communication terminals comprising the wireless communication terminal from a base wireless communication terminal,
obtain, from the physical frame, a signaling field which signals information on a resource allocation to the plurality of wireless communication terminals and comprises a first field which represents a different type of information according to a Multi User (MU) transmission method which is used in a sub-frequency band corresponding to the first field, wherein the sub-frequency band corresponding to the first field is one of a plurality of sub-frequency bands which are included in a frequency band through which the physical frame is transmitted, wherein the first field has a same size regardless of the MU transmission method, wherein the first field represents whether the sub-frequency band corresponding to the first field is not allocated for a transmission of data to any of the plurality of wireless communication terminals,
when Orthogonal Frequency Division Multiple Access (OFDMA) is used for a transmission of data to the plurality of wireless communication terminals, determine, based on the first field, a sub-frequency band which is allocated to the wireless communication terminal, and
obtain, based on the determination, a data corresponding to the wireless communication terminal through the sub-frequency band which is allocated to the wireless communication terminal,
wherein the signaling field has a variable length, and
wherein a length of signaling field is indicated by a number of symbols in the signaling field.

2. The wireless communication terminal of claim 1, wherein the first field includes information on a number of spatial time streams to be transmitted to the wireless communication terminal.

3. The wireless communication terminal of claim 1, wherein the signaling field comprises a second field indicating whether a non-contiguous sub-frequency band is allocated to at least one of the plurality of wireless communication terminals.

4. The wireless communication terminal of claim 1, wherein the processor is configured to check the signaling field in units of a minimum unit frequency bandwidth when the physical frame is transmitted through a frequency band having a bandwidth equal to or greater than the minimum unit frequency bandwidth,
wherein the minimum unit frequency bandwidth indicates a minimum bandwidth of a frequency band usable for transmitting the physical frame by the base wireless communication terminal.

5. A base wireless communication terminal comprising:
a transceiver; and
a processor,
wherein the processor is configured to:
insert a signaling field which signals information on a resource allocation to a plurality of wireless communication terminals and comprises one or more first fields in a physical frame for a transmission of data to each of the plurality of wireless communication terminals, wherein each of the one or more first fields represents a different type of information according to a Multi User (MU) transmission method which is used in a sub-frequency band corresponding to each of the one or more first fields, wherein the sub-frequency band corresponding to each of the one or more first fields is one of a plurality of sub-frequency bands which are included in a frequency band through which the physical frame is transmitted, wherein each of the one or more first fields has a same size regardless of the MU transmission method,
when the base wireless communication terminal uses Orthogonal Frequency Division Multiple Access (OFDMA) for a transmission of data to the plurality of wireless communication terminals, allocate a sub-frequency band to each of the plurality of wireless communication terminals and set a value of each of the one or more first fields based on the allocated sub-frequency band to each of the plurality of wireless communication terminals and whether the sub-frequency band corresponding to the first field is not allocated for a transmission of data to any of the plurality of wireless communication terminals, and
transmit the data to the each of the plurality of wireless communication terminals through the allocated sub-frequency band to each of the plurality of wireless communication terminals,
wherein the signaling field has a variable length, and
wherein a length of signaling field is indicated by a number of symbols in the signaling field.

6. The base wireless communication terminal of claim 5, wherein each of the one or more first fields includes information on a number of spatial time streams to be transmitted to a wireless communication terminal corresponding to each of the one or more first fields.

7. The base wireless communication terminal of claim 5, wherein the signaling field comprises a second field indicating whether a non-contiguous sub-frequency band is allocated to at least one of the plurality of wireless communication terminals.

8. The base wireless communication terminal of claim 5, wherein the processor is configured to, transmit the signaling field in units of a minimum unit frequency bandwidth when the physical frame is transmitted through a frequency band having a bandwidth equal to or greater than the minimum unit frequency bandwidth,
wherein the minimum unit frequency bandwidth indicates a minimum bandwidth of a frequency band usable for transmitting the physical frame by the base wireless communication terminal.

9. A method of operating a wireless communication terminal, the operation method comprising:
- receiving a physical frame for a transmission of data to each of a plurality of wireless communication terminals comprising the wireless communication terminal from a base wireless communication terminal,
- obtaining, from the physical frame, a signaling field which signals information on a resource allocation to the plurality of wireless communication terminals and comprises a first field which represents a different type of information according to a Multi User (MU) transmission method which is used in a sub-frequency band corresponding to the first field, wherein the sub-frequency band corresponding to the first field is one of a plurality of sub-frequency bands which are included in a frequency band through which the physical frame is transmitted, wherein the first field has a same size regardless of the MU transmission method, wherein the first field represents whether the sub-frequency band corresponding to the first field is not allocated for a transmission of data to any of the plurality of wireless communication terminals, from the physical frame, and
- when Orthogonal Frequency Division Multiple Access (OFDMA) is used for a transmission of data to the plurality of wireless communication terminals, determining, based on the first field, a sub-frequency band which is allocated to the wireless communication terminal, and
- obtaining, based on the determination, a data corresponding to the wireless communication terminal through the sub-frequency band which is allocated to the wireless communication terminal,
- wherein the signaling field has a variable length, and
- wherein a length of signaling field is indicated by a number of symbols in the signaling field.

10. The method of claim 9, wherein the first field includes information on a number of spatial time streams to be transmitted to the wireless communication terminal.

11. The method of claim 9, wherein the signaling field comprises a second field indicating whether a non-contiguous sub-frequency band is allocated to at least one of the plurality of wireless communication terminals.

12. The method of claim 9, wherein the obtaining the signaling field comprises checking the signaling field in units of a minimum unit frequency bandwidth when the physical frame is transmitted through a frequency band having a bandwidth equal to or greater than the minimum unit frequency bandwidth,
- wherein the minimum unit frequency bandwidth indicates a minimum bandwidth of a frequency band usable for transmitting the physical frame by the base wireless communication terminal.

* * * * *